United States Patent
Sheu et al.

(10) Patent No.: US 7,620,542 B2
(45) Date of Patent: Nov. 17, 2009

(54) STRUCTURED NATURAL LANGUAGE QUERY AND KNOWLEDGE SYSTEM

(75) Inventors: Phillip Sheu, Irvine, CA (US); Atsushi Kitazawa, Tokyo (JP)

(73) Assignee: Biomedical Objects, Inc., Irvine, CA (US)

( * ) Notice: Subject to any disclaimer, the term of this patent is extended or adjusted under 35 U.S.C. 154(b) by 0 days.

(21) Appl. No.: 11/846,428

(22) Filed: Aug. 28, 2007

(65) Prior Publication Data

US 2007/0294233 A1 Dec. 20, 2007

Related U.S. Application Data

(63) Continuation of application No. 10/286,506, filed on Oct. 31, 2002, now Pat. No. 7,263,517.

(51) Int. Cl.
 G06F 17/27 (2006.01)
(52) U.S. Cl. .................................. 704/9; 704/4; 704/7
(58) Field of Classification Search .................. 704/1–5, 704/7–10
 See application file for complete search history.

(56) References Cited

U.S. PATENT DOCUMENTS

| | | | |
|---|---|---|---|
| 5,696,962 A * | 12/1997 | Kupiec | 707/4 |
| 5,884,302 A | 3/1999 | Ho | |
| 5,924,089 A | 7/1999 | Mocek et al. | |
| 6,026,388 A | 2/2000 | Liddy et al. | |
| 6,304,864 B1 | 10/2001 | Liddy et al. | |
| 6,601,026 B2 | 7/2003 | Appelt et al. | |
| 6,615,172 B1 | 9/2003 | Bennett et al. | |
| 7,027,974 B1 * | 4/2006 | Busch et al. | 704/4 |

OTHER PUBLICATIONS

Bufi et al., A Declarative language for Similarity Queries, IEEE KDEX workshop, Nov. 1999.

* cited by examiner

*Primary Examiner*—Richemond Dorvil
*Assistant Examiner*—Leonard Saint Cyr
(74) *Attorney, Agent, or Firm*—Knobbe, Martens, Olson & Bear, LLP

(57) ABSTRACT

A structured natural language query and knowledge system is provided to allow a user who lacks programming skills to enter a database query or a rule in the form of a structured natural language sentence. The scope of the sentence is preferably defined by an improved object relational query language, an object relational algebra, or both. Command and conditions that appear in natural language form are defined with corresponding formal query texts. A user is prompted to compose a structured natural language sentence using the defined commands and conditions. The user-selected command and its arguments appear as the verb phrase of a structured natural language sentence. The user-selected conditions and their parameters appear as the adjective phrases of the sentence. The sentence is parsed and changed into a translated formal query text for formal database query and rule processing.

24 Claims, 14 Drawing Sheets

STRUCTURED NATURAL LANGUAGE QUERY AND KNOWLEDGE SYSTEM

CLAIM OF PRIORITY

This application is a continuation application of U.S. patent application Ser. No. 10/286,506, filed Oct. 31, 2002 and scheduled to issue on Aug. 28, 2007 as U.S. Pat. No. 7,263,517, which is incorporated by reference herein in its entirety.

BACKGROUND OF THE INVENTION

1. Field of the Invention

The invention relates to the field of relational, object-oriented and object relational databases. More particularly, the invention relates to a structured natural language database query and knowledge system.

2. Description of the Related Art

Relational databases have been used widely for many years. A relational database organizes data into tables that include fields. Two tables that include a same field are related to each other. Compared to the "flat file" approach that stores all data into a single file, the relational approach of tables is more flexible.

Most relational database systems conform to the Structured Query Language (SQL) standard. Commercial vendors produce SQL based database systems such as Oracle, Sybase, Informix, Progress and Microsoft Access. These systems use a SQL-type formal query language. The following are examples of a formal query used to display the names and salaries of those employees who make more than $100,000:

For each employee where employee.salary>100000:
  Display employee. name employee.salary.
End
Or:
Select name, salary
From employee
Where employee.salary >100000

In the above queries, "employee" is the table name, "name" and "salary" are fields of the "employee" table, "where employee.salary>100000" is a condition and also a qualification, and "Display employee.name employee.salary" and "Select name, salary" are commands. A qualification is a condition or a plurality of conditions connected by logical connectors such as "and", "or", "and not" or "or not".

Object-oriented databases organize data into objects. An object can have attributes, which can also be objects. The recursive nature of an object permits ease of manipulation. Objects can inherit characteristics from other objects, making it easier to create new objects based on existing ones. An object can be associated with a set of procedures (methods) to manipulate its data.

Attempts have been made to combine relational databases and object-oriented databases to create object relational databases. For example, American National Standards Institute (ANSI) SQL-99 extends the conventional SQL query language to allow tables and fields to be manipulated as objects. A typical ANSI SQL-99 query is expressed as:

Select arguments
From type var, . . . type var
Where condition and condition . . . and condition A condition is a method with the method's arguments applied to a variable. An argument of the "select" command can be a variable, an attribute of a variable or a method with its arguments applied to a variable. With the addition of methods, the scope of SQL-99 becomes wider than the scope of conventional SQL.

Unfortunately, ANSI SQL-99 still has significant limitations. As described below in more detail, ANSI SQL-99 allows only "range" type variables and does not allow "set," "bag," or temporary variables. The scope of a variable is determined by its type (which is usually a relational table or a class of objects) and cannot be an arbitrary set of objects. Moreover, a condition under SQL-99 does not allow the values produced by a method, whether produced as its returned value or as its parameters, to be used in other conditions. In addition, a method that does not return a logical "true" or "false" value is not allowed to be a condition. Therefore, it would be desirable to introduce a more general and more powerful object relational query language.

Conventional relational algebra has significant limitations too. Under relational algebra, an expression is simply a relation such as a flat file or a set of records whose fields are primitive values such as integers, floating point numbers and text strings. Moreover, a condition of the "select" operator is restricted to:

1. A comparison between two primitive values such as equal to, greater than, less than, greater than or equal to, less than or equal to, not equal to;
2. A comparison between a primitive value and a set of primitive values produced by a sub-query such as "is a member of," "greater than all members of," "greater than any member of," and so forth;
3. A comparison between two sets of primitive values produced by a sub-query such as "is a superset of" or "is a subset of"; and
4. A test on a set of primitive values such as "is an empty set."

In addition, a method typically is not allowed to be an expression under relational algebra. Therefore, it would be desirable to introduce a more general and more powerful object relational algebra.

Conventional databases use data integrity constraints and event triggers to enforce rules on the databases. However, the scope of these rules is limited by the scope of the query language used by the conventional databases. What is desired is a knowledge system that permits more powerful and more flexible ways of specifying rules.

Finally, in a conventional relational or object relational database, a user who lacks programming skills typically cannot compose complex database queries, and must rely on programs written by programmers to search and display data. Therefore the user's options are frequently very limited. It would be desirable to allow such a user to write natural language type instructions to operate on a relational, object-oriented or object relational database in real time.

SUMMARY OF THE INVENTION

For purposes of summarizing the invention, certain aspects, advantages and novel features of the invention have been described herein. It should be understood that not necessarily all such aspects, advantages or features will be embodied in any particular embodiment of the invention.

A structured natural language query and knowledge system is provided to allow a user who lacks programming skills to specify a database query in the form of a structured natural language sentence. The user can also specify a rule in the form of a structured natural language sentence. An improved object relational query language and an object relational algebra are also introduced. In a preferred embodiment, the structured natural language is defined by the object relational query language and the object relational algebra.

One aspect of the invention relates to a computer-implemented method of composing a structured natural language database query. A user is prompted to select a command from a set of defined commands and to specify one or more arguments for the command. The selected command and arguments are combined to form a verb phrase. The user is also prompted to select zero, one or more conditions from a set of defined conditions and to specify zero, one or more parameters for each selected condition. Each selected condition and its specified parameters are combined into an adjective phrase. The verb phrase and the selected adjective phrases are combined into a structured natural language database query.

The structured natural language query is automatically translated into formal query text to be executed by a formal query processing module. The structured natural language query is parsed to identify a verb phrase and zero, one or more adjective phrases. After finding a defined command query text that corresponds to the parsed verb phrase and finding a defined qualification query text that corresponds to each of the parsed adjective phrases, the found query texts are combined into a translated formal query text to be processed by the query processing module.

Another aspect of the invention is related to a computer-implemented method of creating an object relational query for a database. A first variable can be defined as a range variable and a second variable can be defined as a set variable. A command and a qualification are also defined. The defined command, qualification and variables are combined to form an object relational query. Variables can also be defined as temporary variables or bag variables.

Still another aspect of the invention relates to a computer-implemented method of creating an object relational query for a database based on algebraic expressions. A query is built upon one or more expressions. An expression is a set of objects. Thus, a general method that returns as output a set of objects is an expression. A select operator that selects from a set of objects a subset based on a qualification is also an expression. Because an argument of a general method can be a set of objects, general methods can be nested to produce another expression.

Yet another aspect of the invention relates to a computer-implemented method of processing queries expressed in the improved object relational query language or the object relational algebra for a relational, object-relational or object-oriented database system.

Another aspect of the invention relates to a computer-implemented method of grouping structured natural language queries, structured natural language rules or both queries and rules into a macro that in turn can be used as a command or condition for other queries or rules.

BRIEF DESCRIPTION OF THE DRAWINGS

The drawings and the associated descriptions are provided to illustrate embodiments of the invention and not to limit the scope of the invention.

DETAILED DESCRIPTION OF THE PREFERRED EMBODIMENT

The following subsections describe a structured natural language query and knowledge system, an improved object relational query language, and an object relational algebra that embody various inventive features. As will be recognized, many of these features can be implemented within a given system without others. For example, the structured natural language query system can be implemented in conjunction with conventional database platforms, and need not be implemented with the improved object relational query language or with the object relational algebra. In addition, the various inventive features can be implemented differently than described herein. Thus, the following description is intended only to illustrate, and not limit, the scope of the present invention.

A. Structured Natural Language Query and Knowledge System

Figure 1:
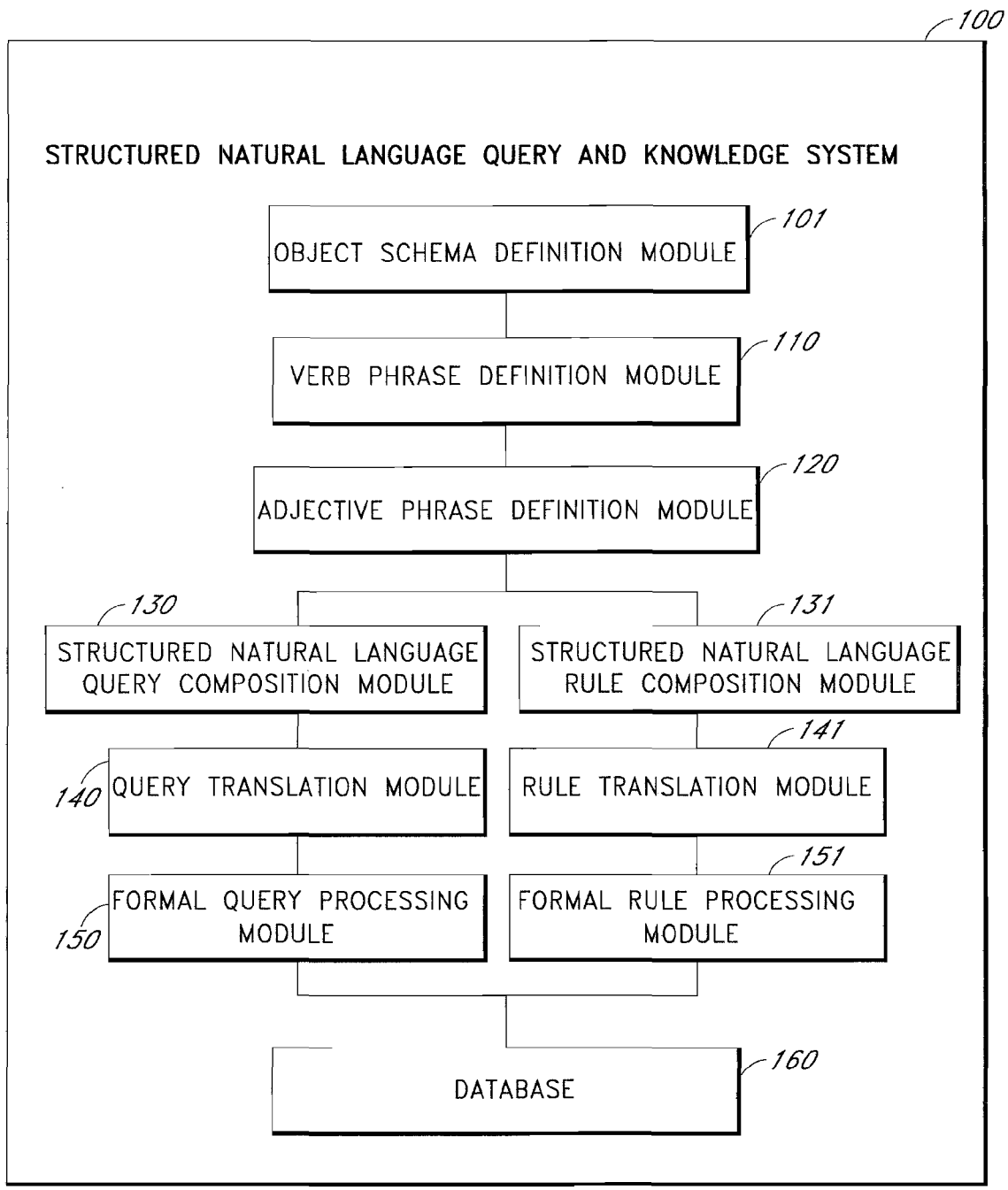
FIG. 1 illustrates one embodiment of a structured natural language system.

FIG. 1 illustrates one embodiment of a structured natural language query and knowledge system 100. The structured natural language system 100 allows a user without programming skills to create a structured natural language query to operate on a database, with the database operation preferably done in real time. The system 100 can also allow a user to convert a relational database into an object-relational database. A structured natural language query may include a verb phrase as a command and zero, one or more adjective phrases as a qualification. A variable definition phrase may also be included in the structured natural language query. The term "query" is broadly defined herein to include not only commands that select or display data, but also commands that create, update or delete data. One embodiment of the system 100 is programmed in Java. The system 100 can also be programmed in C, C++ or other languages, operating platforms or application packages.

As shown in FIG. 1, the system 100 includes a verb phrase definition module 110 and an adjective phrase definition module 120. The verb phrase definition module 110 allows a programmer to define verb phrases to correspond to formal query texts. The adjective phrase definition module 120 allows a programmer to define adjective phrases to correspond to formal query texts. Formal query texts can be methods, functions, subroutines, procedures, SQL query texts, or combinations of the above. The system 100 also includes a structured natural language composition module 130 that allows a user to compose a structured natural language query using the defined verb phrases and adjective phrases. The system 100 further includes a translation module 140 to translate the structured natural language query into formal query text, and a formal query processing module 150 that processes the translated formal query text to return query results from the underlying database 160, which can be a commercial database system.

The system 100 also includes an optional object schema definition module 101. The module 101 allows a user or a programmer to define an object class, including the number of attributes and the type of each attribute for an object class. If the underlying database 160 for the system 100 is a relational database, the object schema definition module 101 allows a user or programmer to associate an object class with a table in the relational database, thus allowing the user or programmer to define the relationships among the tables of the relational database in terms of objects.

For example, a programmer or a user can define a class "polygon" to be associated with the table "POLYGON" in a relational database. The table "POLYGON" includes a "VERTICES" column. The class "polygon" is defined with an "ID" attribute of text string type, and a "vertices" attribute of "set of vertex" type. Another class "vertex" is associated with the table "VERTEX" in the relational database. The class "vertex" is defined with a "name" attribute of text string type, a "x coordinate" attribute of number type, and a "y coordinate" of number type. The object schema definition module 101 thus stores the relationship that each element of the "VERTICES" column in the "POLYGON" table is the name of a row in the "VERTEX" table. A group of "VERTEX" tuples and a "POLYGON" tuple can thus be treated together as a hierarchically structured "polygon" object class. The programmer or user can then define verb phrases and adjective phrases related to the "polygon" object class. If there are no structural relationships among the tables, each table is then treated as an independent object class, with each relational tuple as a "flat" object without hierarchical structures. In any event, a user can still define verb phrases and adjective phrases in structured natural language.

If the underlying database for the system 100 is an object-relational or object-oriented database, then the object schema definitions can be simply imported from the underlying database.

Regarding structured natural language queries, an example sentence is:

Create a group from range1 whose name is "cc" (query A1)
Who are diagnosed to have disease "mild AD" and who respond to medication "aericept".

In the example query above, "create a group from range1 whose name is 'cc'" is a verb phrase of the query, "who are diagnosed to have disease 'mild AD'" is an adjective phrase of the query, and "who respond to medication 'aericept'" is another adjective phrase of the query. Within the verb phrase, "create a group" is a command, "from range 1" is an argument of the command, and "whose name is 'cc'" is a result name of the command operation. Within each of the adjective phrases, "who are diagnosed to have disease" and "who respond to medication" are conditions, and "mild AD" and "aericept" are parameters of the conditions.

The query and knowledge system 100 can also include a structured natural language rule composition module 131, a rule translation module 141, and a formal rule processing module 151. The modules 131, 141 and 151 are described below in connection with rules.

In FIG. 1, each of the modules 101-151 is preferably implemented with software executed by one or more general-purpose computers. Some or all of the modules could alternatively be implemented in whole or in part within application-specific hardware. As will be recognized, the modules need not run or reside on the same computer. For example, modules 110-141 could be integrated into a client-side component that runs on a user computer, while the formal processing modules 150 and 151 could run on a remote server that provides network-based access to a database. Further, the translation modules 140 and 141 could be implemented as a server-side component that translates natural language queries and rules received over a network from users. The modules of the system 100 can be implemented in the same or different computing languages, operating platforms or application packages.

Figure 2:
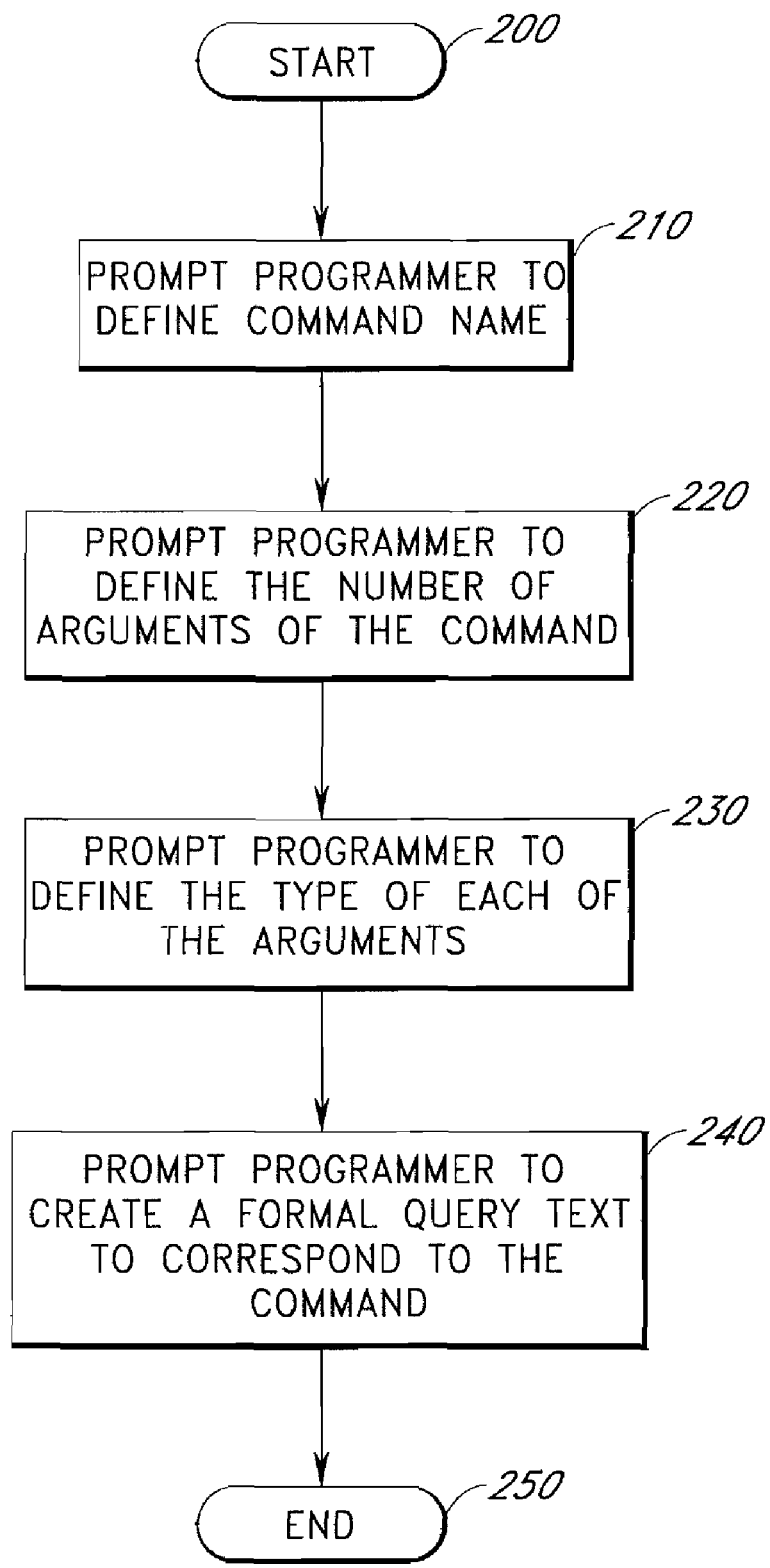
FIG. 2 illustrates one embodiment of a process of defining a command.

FIG. 2 illustrates one embodiment of a computer-implemented process to define a verb phrase. At block 210, the system 100 prompts a programmer to define a command name. A command name is a text string such as "create a group", "combine two groups", "find similar genes from two groups", "show elements of a group", "store", and so forth. The command is preferably defined with the appearance of a natural language phrase and thus is easy for users without programming skills to understand.

At block 220, the programmer is prompted to define the number of arguments for the command. For example, a "create a group" command typically has 1 argument and a "find similar genes from two groups" command typically has 2 arguments. The programmer may also define the selection range for each argument. For example, one argument for a patient name can be any user-entered text string, and another argument for the name of an authorized insurer must be a value from a pre-determined list of values. At block 230, the programmer is prompted to define the data type of each of the arguments of the command. A data type can be a primitive data type such as integer, floating number, date or text string, or another data type defined by a user or a programmer. A new data type can be defined as a set of objects of a given data type. For example, given the defined data type "vertex", a new data type "Vertex Set" can be defined such that each object of the "Vertex Set" data type is a set of vertices. From block 230, the process proceeds to block 240, where the programmer is prompted to create a formal query text to correspond to the defined verb phrase.

The term "formal query text" is used broadly in the present application to include text in the form of a query language, the name of a collection of computer code such as a method, function, procedure or subroutine, or the name of a macro. For example for the condition "(a gene) is similar to (another gene)," a method, function, procedure or subroutine can be "Var0.similar(Var1)", with "Var0" and "Var1" representing the two parameters of the condition respectively. As another example, for the command "find similar genes from two groups," a method, function, procedure or subroutine can be "find_similar_genes(argument1, argument2)," with "argument1" and "argument2" representing the two arguments of the command respectively. The collection of computer code is stored in a system library (not shown). As described below, a macro is a logical unit for a group of queries, a group of rules, or a group of one or more queries and one or more rules.

The process illustrated in FIG. 2 can be implemented in other orders. For example, in one embodiment, the programmer is first prompted to create a formal query text for a verb phrase to be defined. The system 100 parses the formal query text, and determines the number of arguments for the verb phrase and the data type of each of the arguments. The programmer is then prompted to define a command name for the verb phrase.

Figure 3:
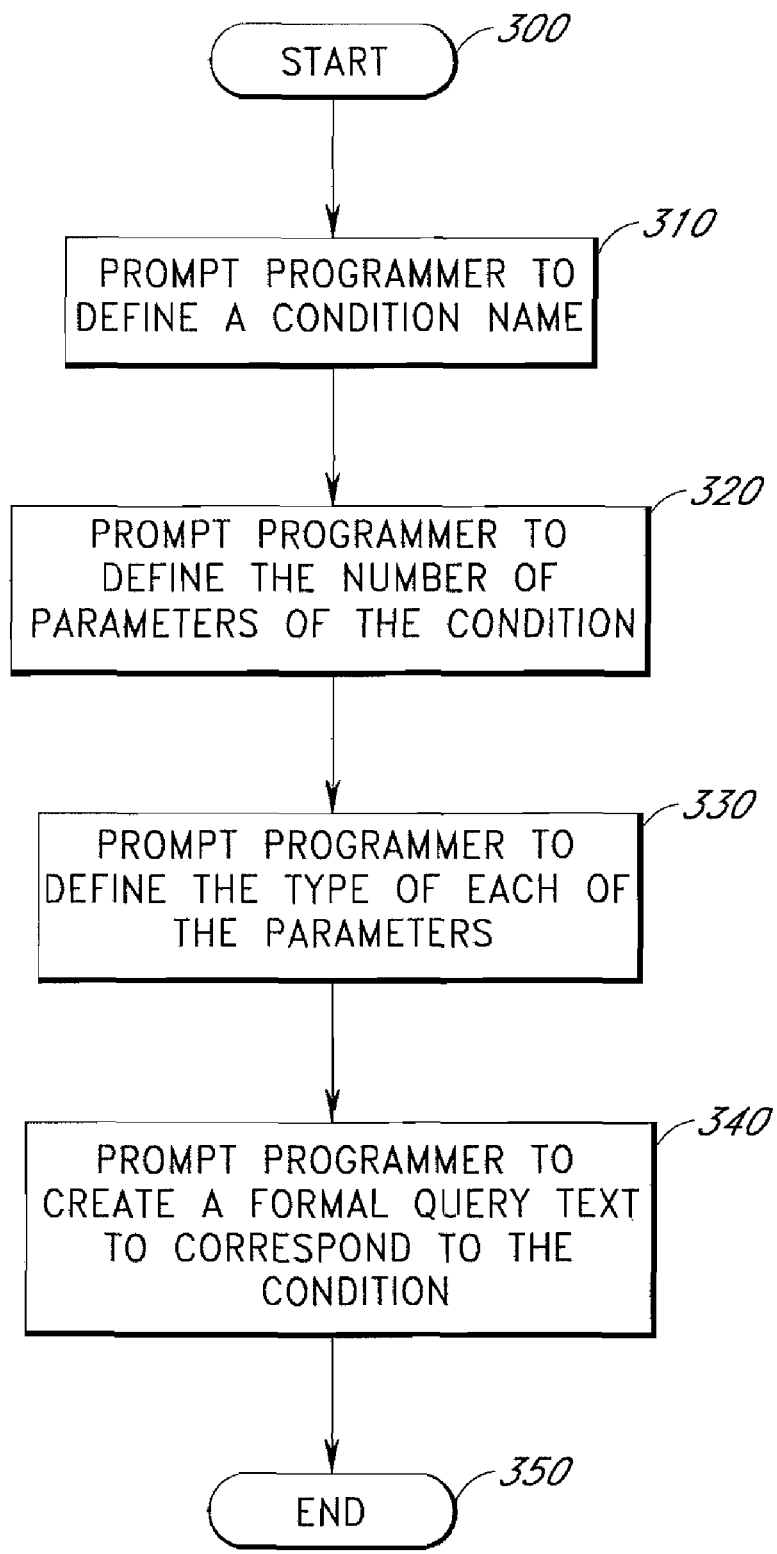
FIG. 3 illustrates one embodiment of a process of defining a condition.

FIG. 3 illustrates one embodiment of a computer-implemented process of defining a condition. At block 310, the system 100 prompts a programmer to define a condition name. Example condition names include "who are diagnosed with disease" and "who respond to medication". The process then proceeds to block 320, where the programmer is prompted to define the number of parameters for the condition. At block 330, the programmer is prompted to define the data type of each of the parameters, such as text, integer and so forth. The programmer can also be prompted to specify if a parameter is an input parameter or an output parameter. At block 340, the programmer is prompted to create a formal query text to correspond to the defined condition, for example typing texts in a query language, specifying a macro name, or specifying the name of a computer code collection such as a method name, function name, procedure name or subroutine name. The computer code collection is stored in the system library.

For example, for the condition "who are diagnosed with disease", an example formal query text can be "<argument1>.diagnosed(<parameter>)" or "<argument1>.diagnosed=<parameter>". In this example, "<argument1>" represents the command argument of the related verb phrase, and "<parameter>" represents the condition parameter value to be entered by the user.

The process illustrated in FIG. 3 can be implemented in other orders. For example, in one embodiment, the programmer is first prompted to create a formal query text for the condition to be defined. The system 100 then parses the formal query text and determines the number of parameters for the condition and the data type of each of the parameters. The programmer is then prompted to define a condition name.

The verb phrases and adjective phrases can be defined to correspond to complex queries. For example, the condition "who are diagnosed with all diseases" can be defined to include a set parameter that allows a list of diseases. A query with this condition finds patients who are diagnosed with all of the listed diseases. Another condition "who are diagnosed with at least one of the diseases" can be defined to include a set parameter that allows a list of diseases. A query with this condition finds patients who are diagnosed with at least one of the listed diseases. In another arrangement, only the condition "who are diagnosed with disease" is defined and includes a parameter that allows only one entry of a disease name. If a user wants to find patients who have both diseases A and B, the user combines two such adjective phrases "who are diagnosed with disease A" and "who are diagnosed with disease B".

It should be noted that verb phrases and adjective phrases can be defined and used interchangeably to some extent. For example, the more specific verb phrase "find patients who are diagnosed with disease" serves the same purpose as the combination of the more general verb phrase "find patients" and the adjective phrase "who are diagnosed with disease". If a query is frequently invoked by users, it may be preferable to define the query as a verb phrase that does not require additional adjective phrases. It is also feasible to define both specific and general verb phrases, and allow users to use either the specific verb phrase or the general verb phrase combined with adjective phrases.

In one embodiment, a structured natural language query can be created in the form of a question, such as "which patients are diagnosed with disease 'mild AD' and who respond to medication 'aericept'?". It is equivalent to the query "display patents who are diagnosed with disease 'mild AD' and who respond to medication 'aericept'". In the query in the form of a question, the portion "which patients" or "which patients are" serves as the verb phrase.

A structured natural language query may include a variable definition phrase. For example, as described below in subsection B, if the improved object relational query language of subsection B is used in conjunction with the system 100, an example variable definition phrase can be "range of <Variable> is polygon:abc". It means that the values of <Variable> are obtained from a collection of objects named "abc", whose elements are bound to the type "polygon". A variable definition phrase can include one or more variable definitions.

Although a user who is not a programmer may also define a verb phrase and a condition, the term "programmer" is used in connection with FIG. 2 and FIG. 3 because some programming skills may be need to create a formal query text that correspond to a defined verb phrase or condition.

Figure 4:
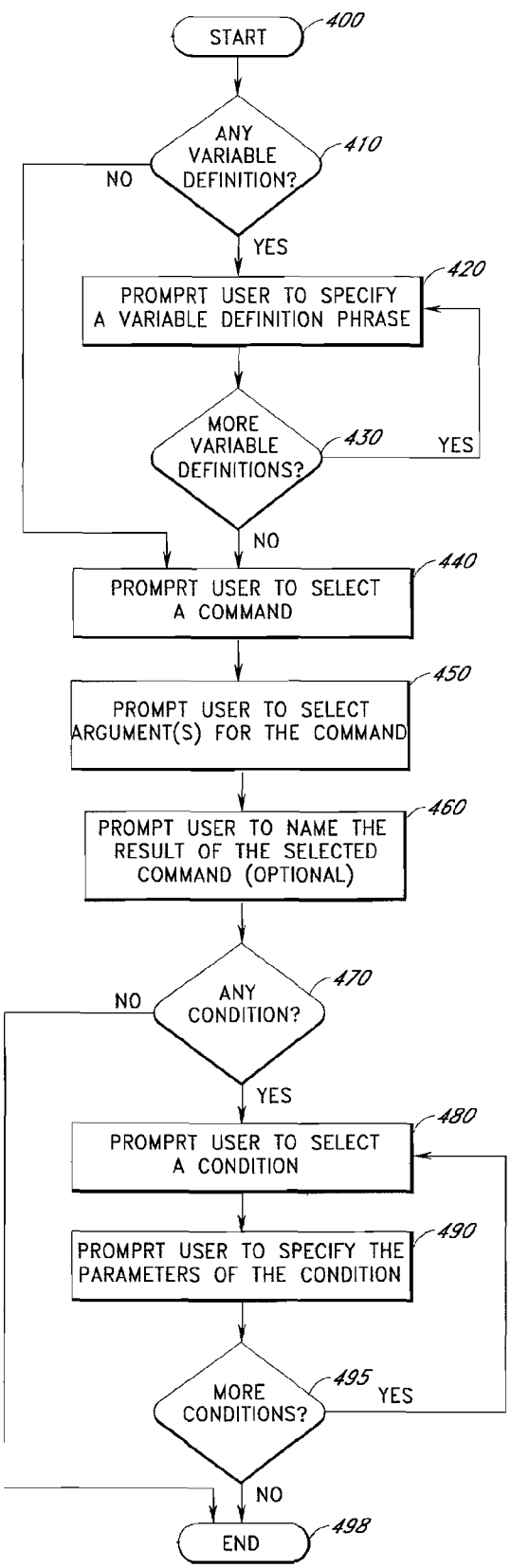
FIG. 4 illustrates one embodiment of a process of composing a structured natural language query.

FIG. 4 shows one embodiment of a computer-implemented process of composing a structured natural language query. In a preferred embodiment, the query is composed with the improved object relational query language described in subsection B. At a block 410, the process determines whether variables will be defined by a user. If variables are to be defined, the process proceeds to a block 420, where the process prompts a user to specify a variable definition phrase. It should also be understood that variable definition phrases, command and conditions need not be specified in any particular order. In other words, variable definition phrases need not be specified before the command is specified, and the command need not be specified before conditions are specified.

Figure 5:
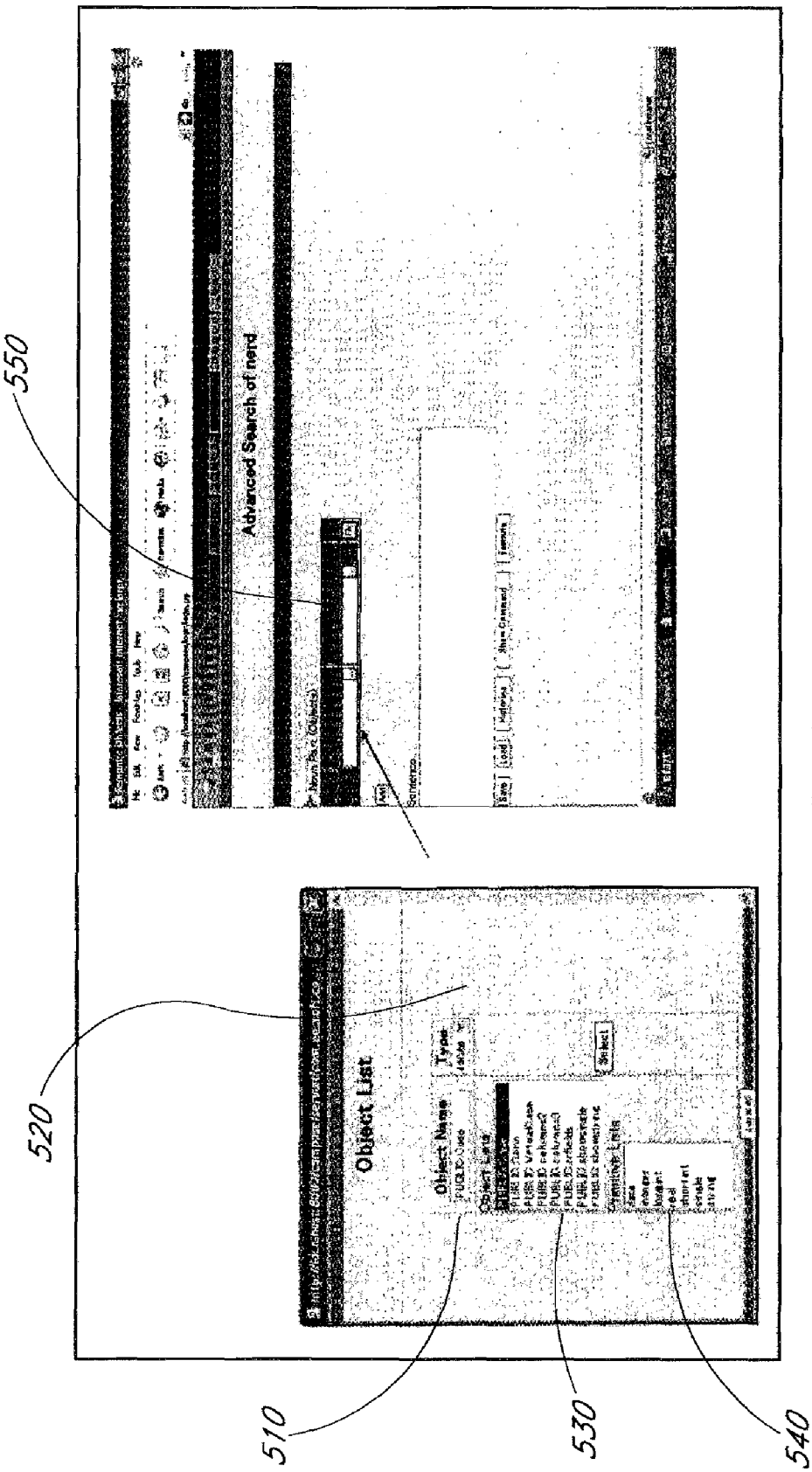
FIG. 5 illustrates example user interface screens that prompts a user or a programmer to define an object variable.

FIG. 5 illustrates example screens that prompt a user or a programmer to specify a variable definition phrase. As shown in FIG. 5, in an embodiment in accordance with an improved object relational query language described below in subsection B, a user or programmer is prompted to create an object name in the "Object Name" section 510. The user or programmer is also prompted in the "Type" section 520 to identify the variable type of the created object by selecting from a list of types such as "range", "temp", "set" and "bag". The user or programmer is further prompted to identify the data type of the created object by selecting an object from the "Object Lists" section 530 to inherit the data type of the selected object, or by selecting from the "Primitive Lists" section 540 of primitive data types. The user or programmer is prompted to specify in the "Data Source Element" section 550 the data source element for the created object. A data source element is a set of objects of the same type.

Figure 6A:
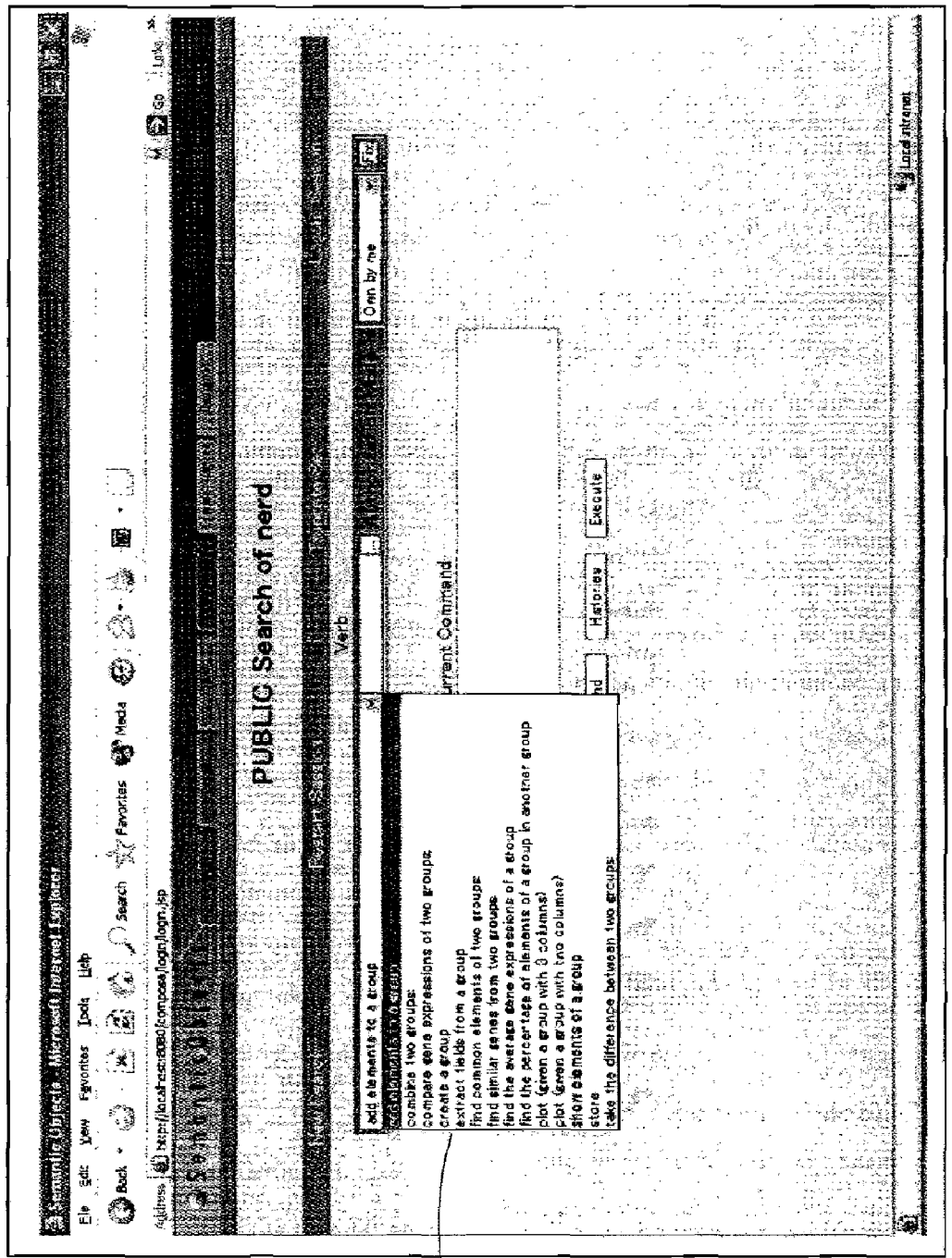
FIG. 6A is an example user interface screen that prompts a user to select a command.
Figure 6B:
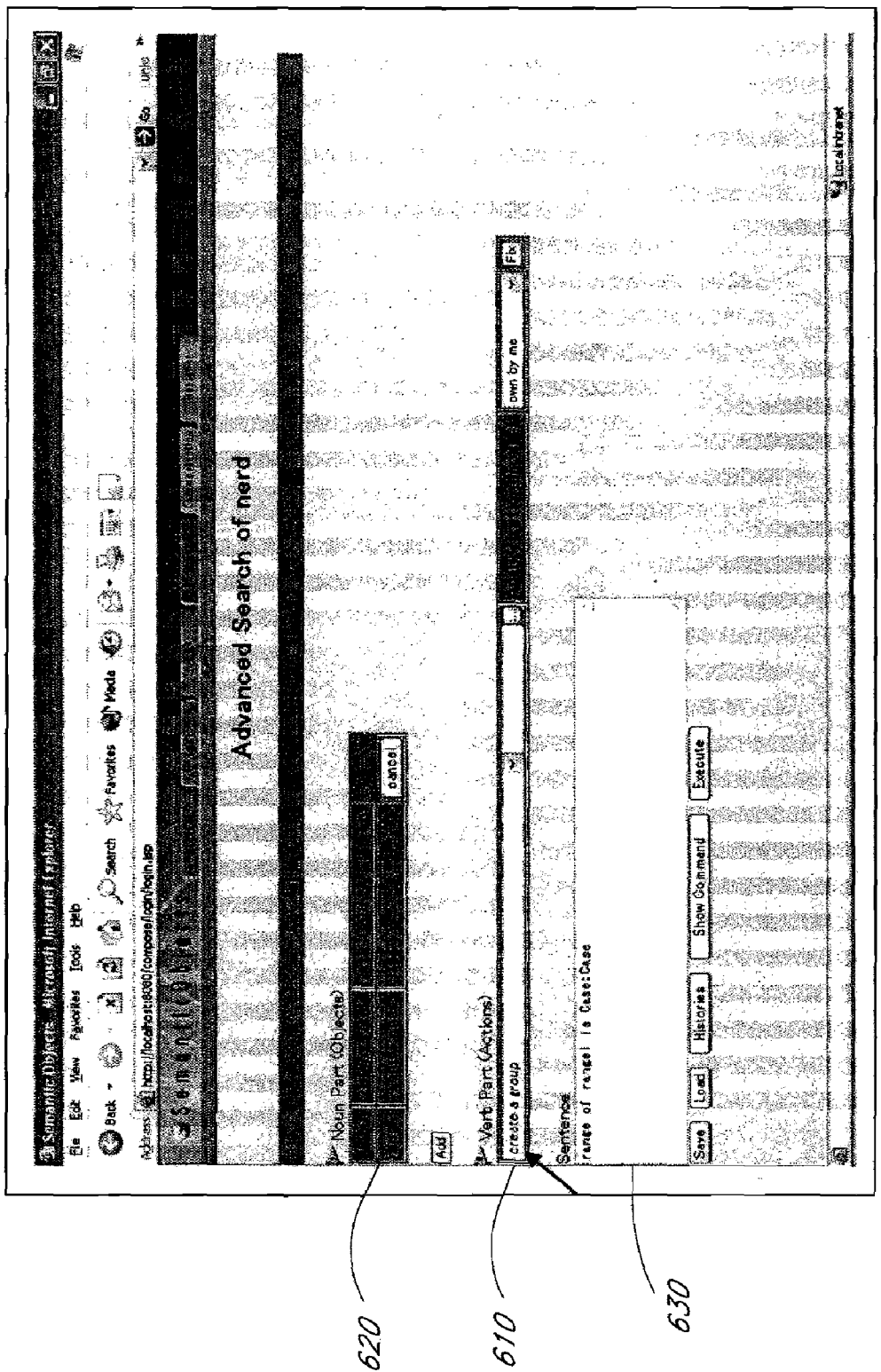
FIG. 6B is another example user interface screen that prompts a user to select a command.
Figure 8A:
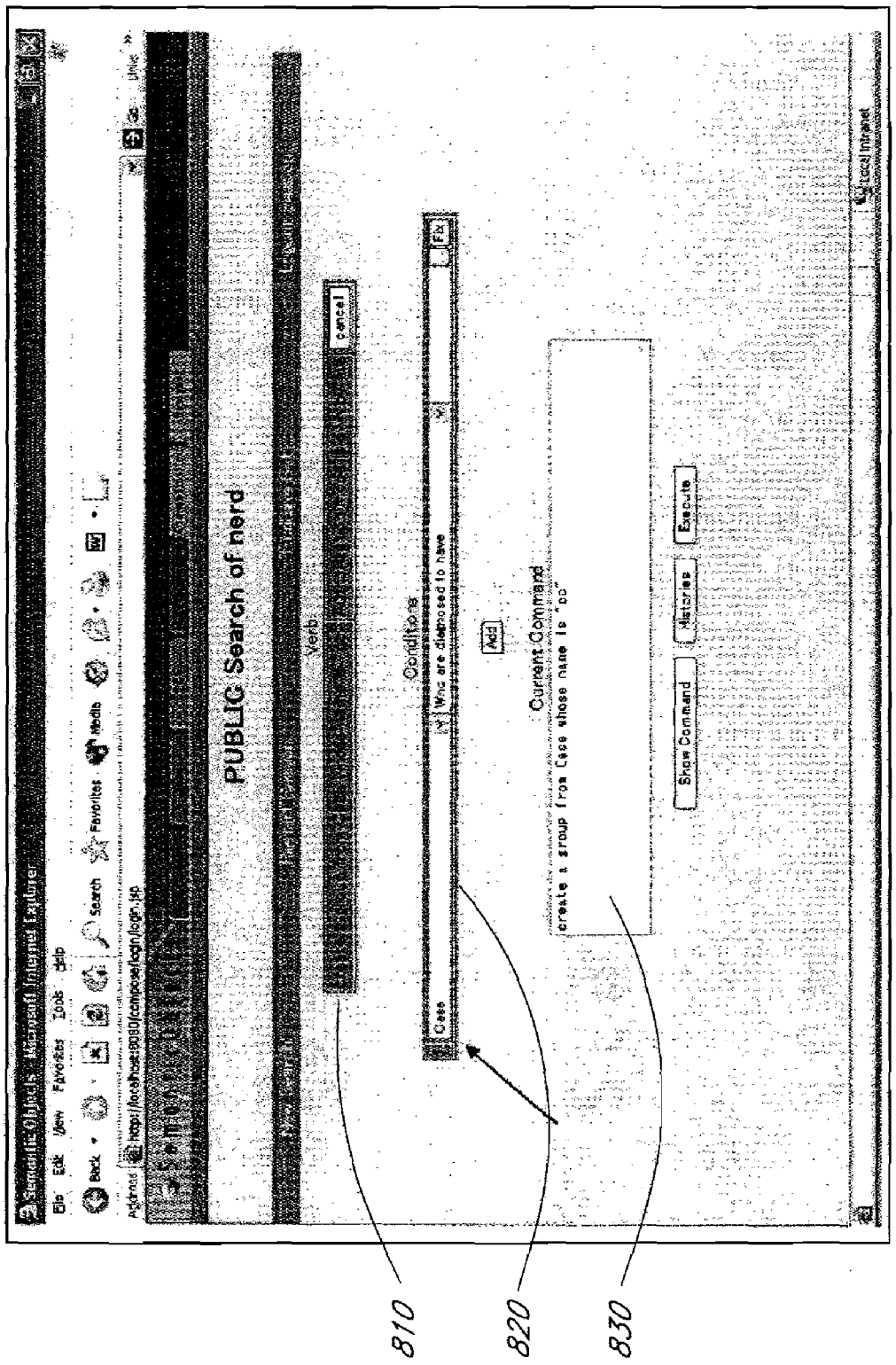
FIG. 8A is an example screen that prompts the user to select a condition.
Figure 8B:
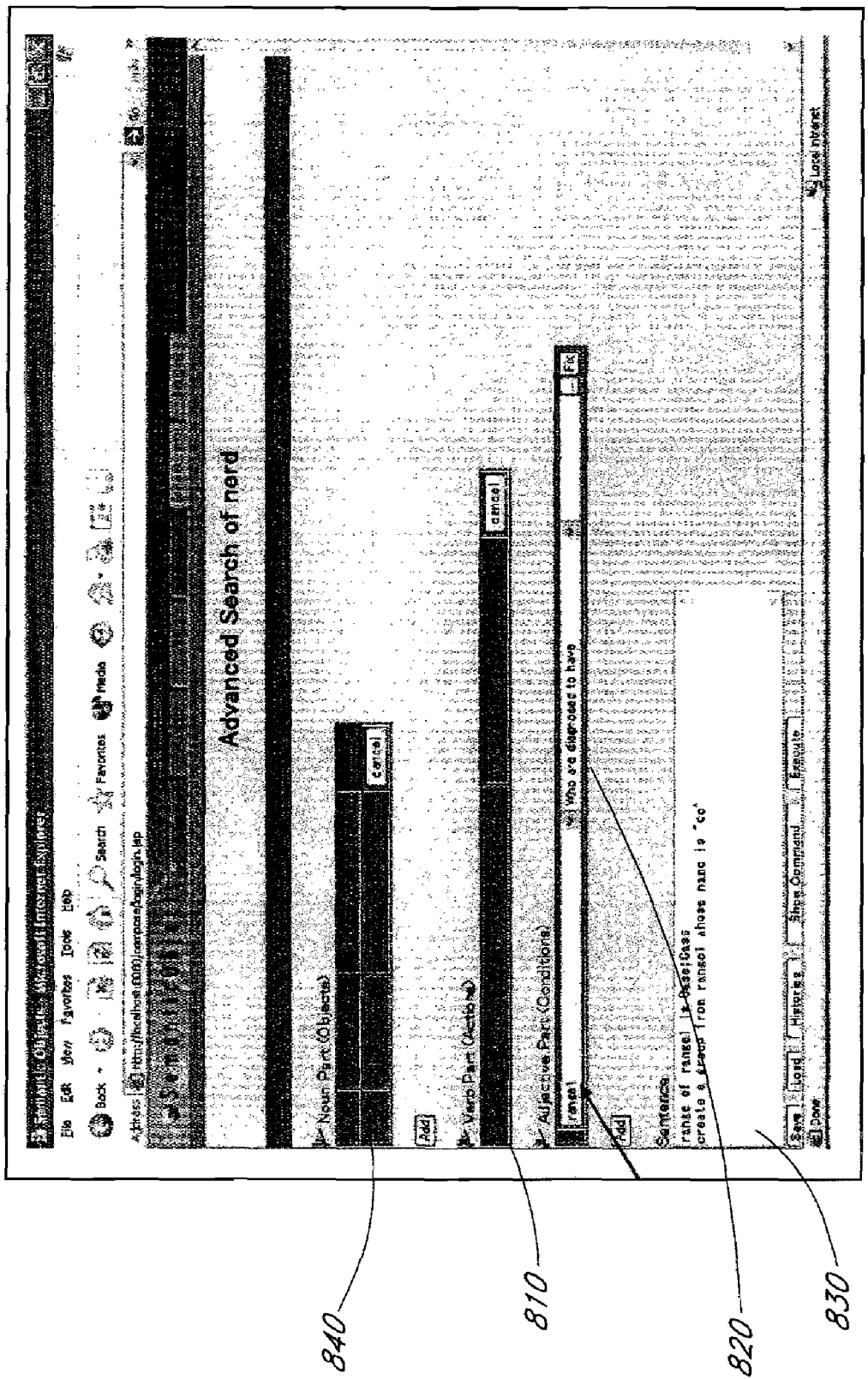
FIG. 8B is another example screen that prompts the user to select a condition.

In another embodiment in which the object-relational algebra of subsection C is used, the blocks 410-430 are omitted and the user is not prompted to define variables. Variables are pre-defined by a programmer, and the user directly proceeds to a block 440. In order to demonstrate both options, FIGS. 6A and 8A are presented as example screens that do not display variable definitions, while FIGS. 6B and 8B are presented as example screens that display variable definitions.

Variable definition phrases can also be automatically generated based on the selected commands and conditions. In the example described below in subsection B with two object classes "polygon" and "vertex", the condition "contains" requires two polygons as inputs and returns a true value if the first polygon contains the second. The system 100 stores the specification that the "contains" condition requires two input parameters of polygon class. When the condition "contains" is selected by the user, the system 100 automatically generates a variable definition phrase to define the two input parameters as range variables of polygon class. In another example, the condition "intersection" requires two input parameters of polygon class and an output parameter as the intersection polygon of the two input polygons. The "intersection" condition returns a "true" logical value. The system 100 stores the specification that the "intersection" condition requires two input parameters of polygon class and an output parameter of polygon class. When the user selects the "intersection" condition, the system 100 automatically generates a variable definition phrase to define the two input parameters and the output parameter. The two input parameters are preferably defined as range variables and the output parameter is preferably defined as a temporary variable. If the output parameter is used as an input parameter of another condition, then the input parameter of the other condition do not need to be defined again.

At the block 440, the user is prompted to select a command from a list of defined commands. In one embodiment, the user is prompted to select from a list of defined commands that are applicable to the objects defined in the variable definition phrase. For example, if the variable definition phrase defines a variable "polygon", then the user can select from those commands that are applicable to the "polygon" variable, such as "enlarge", "reduce", "rotate", "measure area", and so forth. FIG. 6A and FIG. 6B are example user interface screens that prompt the user to select a command from a list 610 of commands. Compared to FIG. 6A, FIG. 6B includes an additional section 620 that displays the defined variables. The defined variables are also displayed in the sentence section 630.

Figure 7:
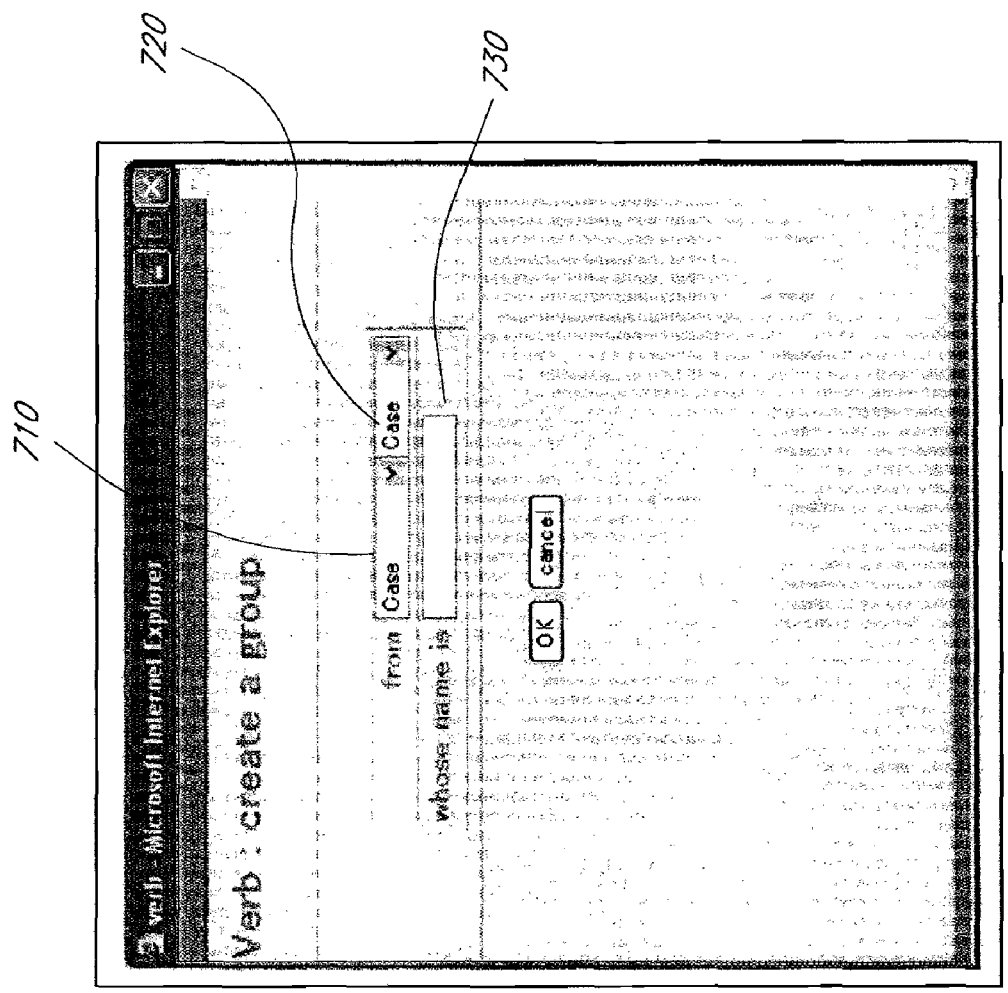
FIG. 7 is an example screen that prompts the user to select command arguments and optionally name a result.

Referring back to FIG. 4, from the block 440, the process proceeds to a block 450, where the user is prompted to select one or more arguments for the selected command. At a block 460, in one embodiment that preferably uses the object relational algebra of subsection C, the user is prompted to optionally specify a result name of the selected command. The command, arguments and optional result name form a verb phrase. FIG. 7 is an example screen that prompts the user to select command arguments and optionally name a result. Depending on the number and type of defined arguments for the command, the user may be prompted to identify one or more arguments. As shown in FIG. 7, in one embodiment in accordance with an object relational algebra described below in subsection C, for the command "create a group", the user is prompted to select a data type from section 710, select a data source element from section 720, and optionally name a result of the command in section 730.

Referring back to FIG. 4, if the user wishes to select a condition, then the process proceeds from a block 470 to a block 480, where the user is prompted to select a condition from a list of defined conditions. In one embodiment, the user is prompted to select from a list of defined conditions that are applicable to the objects defined in the variable definition phrase. For example, for a variable "polygon", conditions such as "contains", "intersect" and "is a square" are applicable to the "polygon" variable. FIG. 8A is an example screen that prompts the user to select from a list of conditions. A defined verb phrase is displayed in section 810 and as part of a structured natural language sentence in sentence section 830. The user selects a condition from a list of conditions in section 820. FIG. 8B is another example screen that prompts the user to select from a list of conditions. Compared to FIG. 8A, FIG. 8B includes an additional section 840 that displays the defined variables. The defined variable definition phrase and verb phrase are displayed as parts of a sentence in the sentence section 830.

Figure 9:
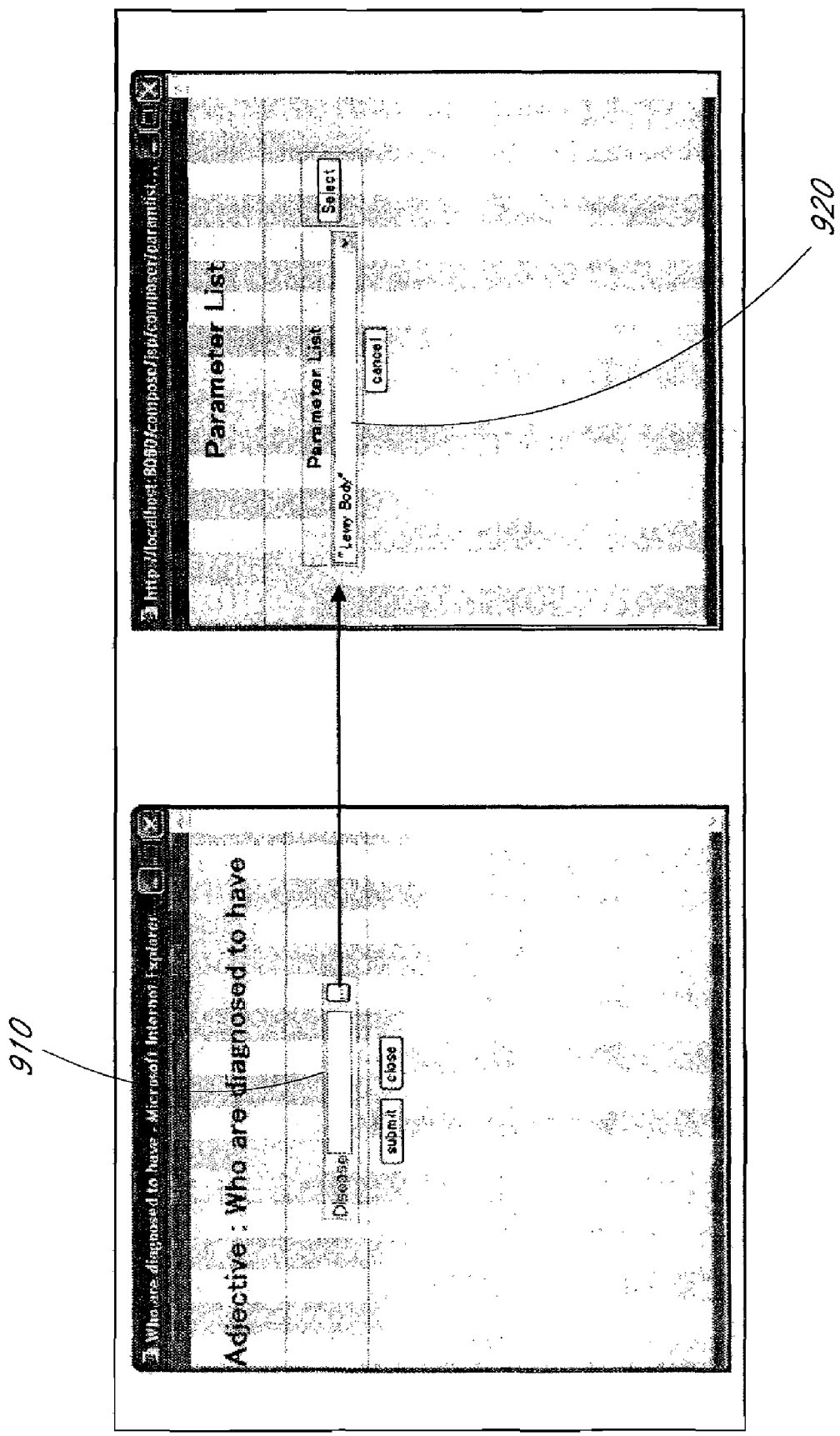
FIG. 9 is an example screen that prompts the user to specify parameters for the selected condition.

Referring back to FIG. 4, at a block 490, the user is prompted to specify the parameters of the selected condition. In one embodiment, multiple conditions are allowed to share the same condition name but with different numbers of parameters. FIG. 9 is an example screen that prompts the user to specify parameters for the selected condition. As shown in FIG. 9, for the condition "Who are diagnosed to have", the user can type in a disease name in section 910, or select from a list of disease names in section 920. The selected condition and parameters form an adjective phrase. In one embodiment, the composition module 130 automatically puts quotation marks around the specified values of command arguments, named result and condition parameters. If the condition has one or more output parameters, the user can also specify an additional condition by defining the output parameters of the original condition as the input parameters of the additional condition. The additional condition thus evaluates a condition based on the output produced by the original condition.

Referring back to FIG. 4, at a block 495, the user is prompted to indicate whether more conditions will be entered. If more conditions will be entered, then the process returns to the block 480. Otherwise the process proceeds to an end block 498. If the process returns to the block 480 to specify another adjective phrase, the user is also prompted to specify a logical connector such as "and", "or" or "and not" to join the two adjective phrases.

As described above, FIGS. 5-9 are example screens of one embodiment that prompts a user to select from lists of defined commands and conditions. The user selects a command in FIG. 6A or FIG. 6B, selects arguments for the command in FIG. 7, selects a condition in FIG. 8A or FIG. 8B, and specifies parameters for the condition in FIG. 9. In one embodiment, the user or a programmer also defines variables in FIG. 5.

Figure 10:
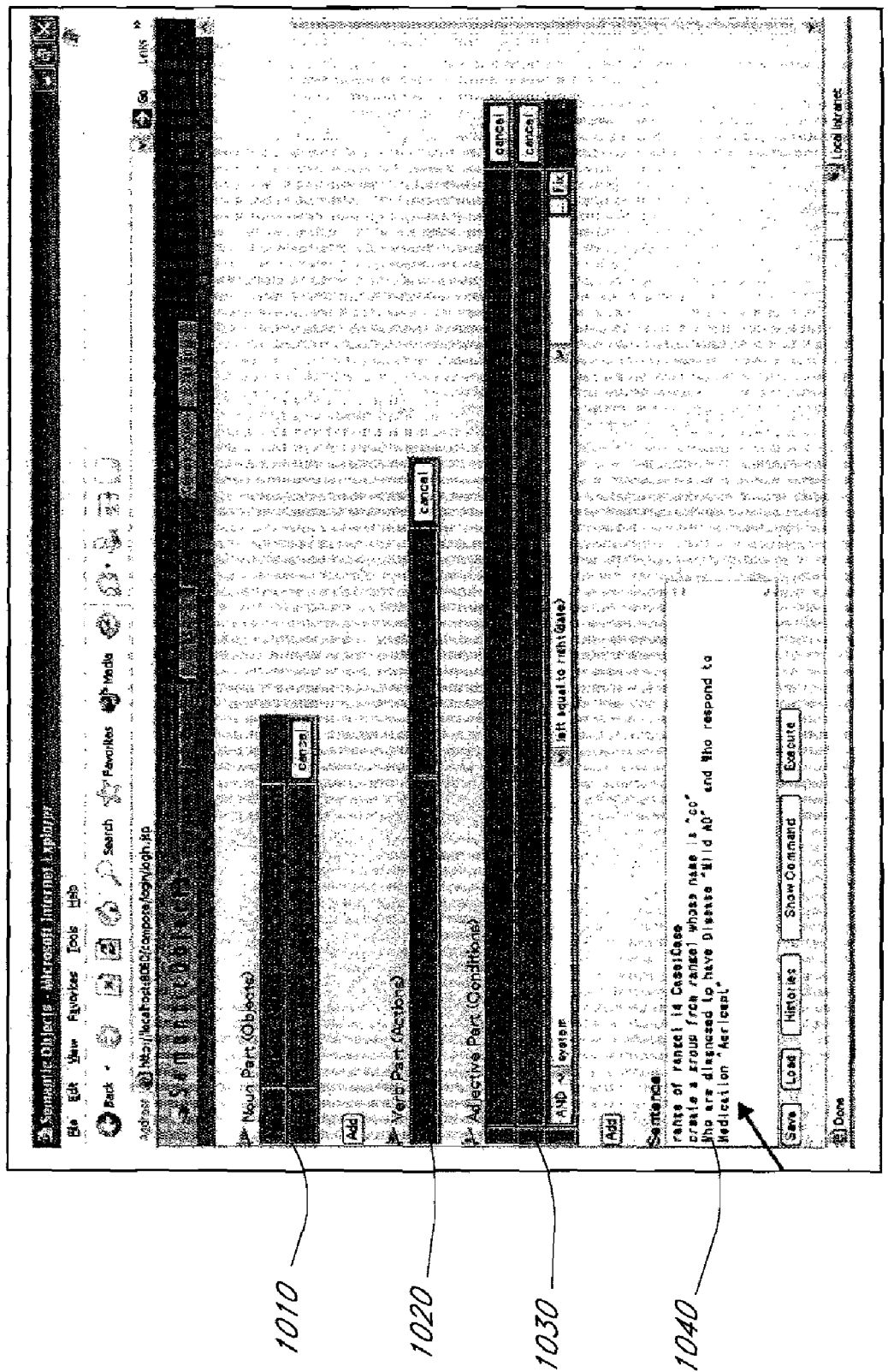
FIG. 10 is an example screen that displays a composed query.
Figure 11:
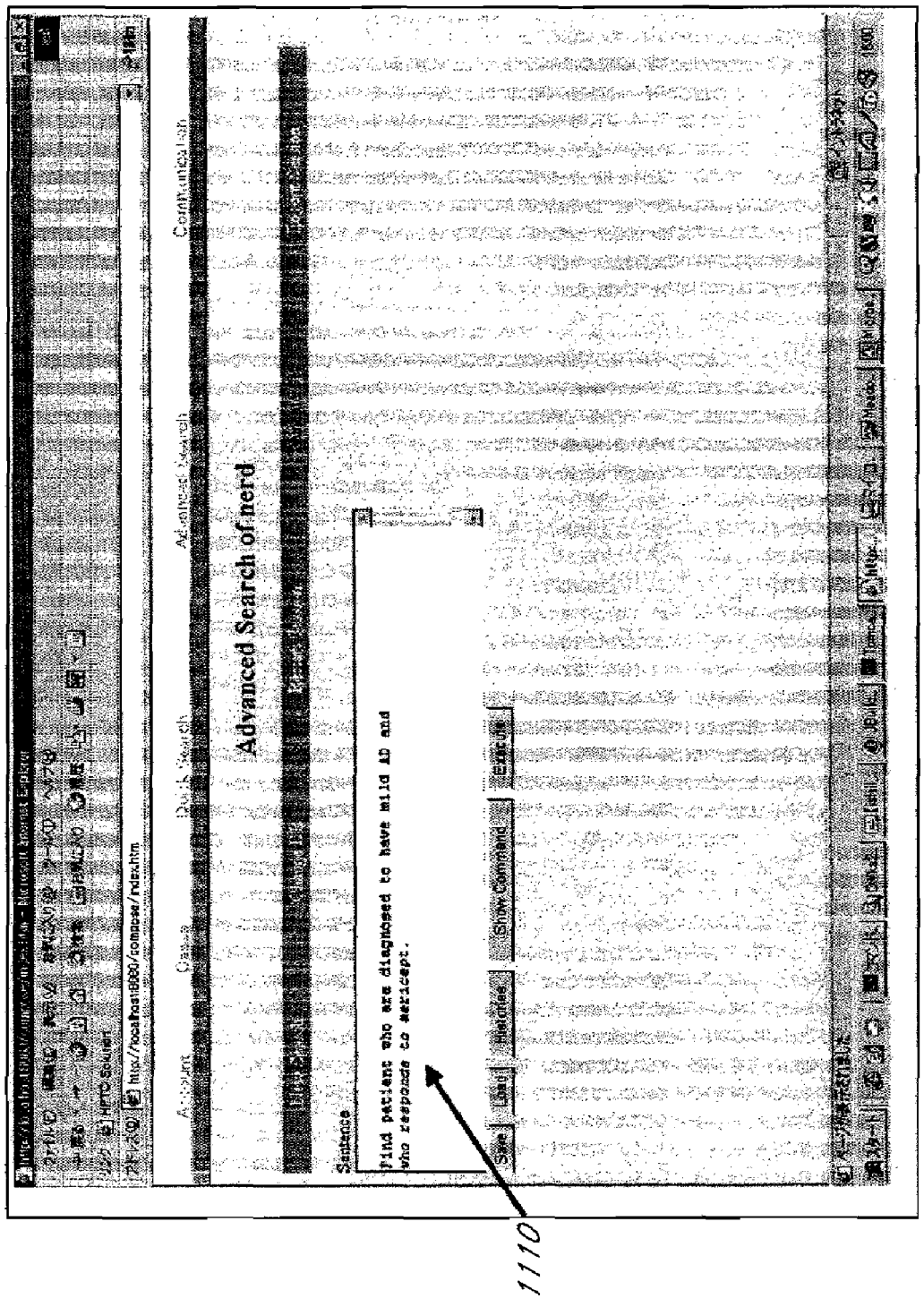
FIG. 11 is an example screen that prompts the user to type a structured natural language sentence.

The specified verb phrase and adjective phrases form a composed structured natural language query. FIG. 10 is an example screen that shows a composed structured natural language query sentence in section 1040 including a verb phrase in section 1020 and adjective phrases in section 1030. In FIG. 10, the query appears in a preferred form of an imperative sentence. The query may also include a variable definition phrase, such as the phrase "range of range1 is Case:Case" shown in sections 1010 and 1040 of FIG. 10. The user can also be given the option to directly type a structured natural language query into the system 100, as shown in the sentence section 1110 of FIG. 11. Experienced users may prefer this option. Users can also use a combination of direct typing and screen selection, for example typing the conditions or commands they are familiar with and selecting other conditions or commands from the menus. The composed query is then sent to the translation module 140 for translation.

The translation module 140 parses the composed query to identify the verb phrase, the adjective phrases and the optional variable definition phrase. In a preferred embodiment, the translation module 140 looks for keywords that indicate defined verb phrases or defined adjective phrases. For example, in one embodiment where all conditions start with the word "who" or "whose", the translation module 140 searches for words "who" and "whose" and identifies any such words as signaling the start of an adjective phrase. However, if the word "who" or "whose" is enclosed in quotation marks in the composed query, then it is considered to represent an argument, named result or parameter value instead of the start of a condition. The translation module 140 also searches for logical connectors "and", "or", "or not" and "and not". A logical connector indicates the end of one adjective phrase and the start of another adjective phrase. By searching for condition labels and logical connectors, the module 140 can identify an adjective phrase as separated from the rest of the query and separated from the other adjective phrases.

The translation module 140 also searches for keywords of the defined conditions to identify the conditions. For example, the translation module 140 searches for keywords such as "diagnosed" or "respond" as identifying the condition "who are diagnosed with the disease" or "who respond to medication".

The translation module 140 also searches for keywords of the defined commands to identify the command. For example, the module 140 searches for keywords such as "create a group" or "add elements to a group" to identify the corresponding commands. The module 140 can also search for keyword "from" to signal a command argument and keyword "whose name is" to signal a named result.

If the command and conditions are not typed by a user but selected from lists of defined commands and conditions, then the parsing process can be simplified. Because the system 100 associates each of the defined commands and conditions with its corresponding formal query text, the corresponding formal query text can be stored at the same time the user selects a command or condition. The stored corresponding formal query texts (or their identifiers) are combined by the translation module 140 to form a translated formal query text. On the other hand, if the user enters a structured natural language query by typing instead of selecting from lists, then the parsing process first identifies the verb phrase and adjective phrases, and then combines their corresponding formal query texts.

In a preferred embodiment, the translation module 140 detects errors in a query and automatically corrects errors or suggests corrections to errors. Query errors may include misspellings (for example "diagnosed" misspelled as "diagnoised"), missing words (for example "who respond to medication" entered as "who respond to"), out-of-order structures (for example adjective phrases appearing before the verb phrase), or other grammar errors. The translation module 140 corrects these errors and transforms the query to a correct query. In one arrangement, the translation module 140 returns the detected errors and a suggested corrected query to the user, and asks the user to confirm that the corrected query is what the user intended to compose.

The translation module 140 combines the corresponding formal query texts of the verb phrase and adjective phrases of the structured natural language query to form a translated formal query text. The user-specified command argument values and condition parameter values are incorporated into the translated formal query text. The formal query processing module 150 receives the translated formal query text and processes the text on the underlying database to produce results.

The underlying database 160 can be relational, object-oriented or object relational. For a relational underlying database, if the translated query text is already in the form of one or more SQL queries, then the formal query processing module 150 directly executes the SQL queries on the underlying relational database. If the translated query text is not in SQL query form, then the formal query processing module 150 converts the translated query text into one or more converted SQL queries, and executes the converted queries on the underlying relational database. Likewise, for an object or object relational underlying database, the query processing module 150 directly executes the translated query text, or converts the translated query text into one or more converted queries that can be directly executed on the underlying database.

If the query processing module 150 cannot directly execute the translated query text and cannot convert the translated query context, query processing module 150 still processes the translated query text to return query results from the underlying database 160. For example, in one embodiment with a relational underlying database, using the improved object relational query language described in subsection B, a first variable "t" is defined as a range variable from a first data source element of five polygon objects. A second variable "s" is defined as a range variable from a second data source element of three polygon objects. For a qualification "where t and s intersect," the translated query text "t.intersect(s)" cannot be directly executed on the relational underlying database. The query processing module 150 enumerates the fifteen combinations of the polygon objects of the two data source elements to determine whether the qualification is true. In addition to the brute-force evaluation of all possible combinations, optimization methods, for example rearranging the order of the conditions in a qualification, can also be employed.

In one preferred embodiment, the structured natural language system 100 works in conjunction with the improved object relational query language described in subsection B. For example, a user creates a variable definition phrase "range of range1 is case:case" in FIG. 10, to define range1 as a range variable in accordance with the improved query language described in subsection B. The first "case" in "case:case" represents a data type and the second "case" represents a data source element. Alternatively, the system 100 prompts the user to define a variable by selecting from a list of data types, a list of data source elements, and as a range, temporary, set or bag variable. However, the structured natural language system 100 can also work with conventional relational, object-oriented, and object relational databases. The improved object relational query language or the object relational algebra would expand the scope of permitted queries, but is not a prerequisite for the structured natural language system 100.

Rules can also be composed in structured natural language form and used in the system 100 for data integrity and other purposes. For example, a rule can be presented in the form "On <event> If <qualification> then <command>", "On <event> If <qualification> then <command> otherwise <command2>", or "On <event> If <qualification> then <qualifcation2>". Using a computer system for medical use as an example, rules can be used to ensure that a patient's age entered into the system is greater than zero, that penicillin is not administered if the patient is known to be allergic to it, that two types of medications of negative interaction are not administered to the same patient, and so forth. A rule's scope can be defined to apply to a single object, to apply to all objects of a class, or to all objects. In one embodiment, the structured natural language system 100 allows a user to define a rule by specifying a qualification and a command of the rule. When an event happens (for example, when a patient's temperature changes), if a qualification (for example, patient's body temperature exceeds 102 degrees Fahrenheit) is satisfied, then a command (for example, send a warning to a nurse or physician) is activated according to the rule. In some embodiments, events and qualifications can be used interchangeably.

Structured natural language queries and structured natural language rules are typically used in different contexts. For example, the system 100 monitors the qualification and the optional event of a rule at all times, and executes the rule's command when the qualification and optional event are met. On the other hand, a query is typically executed based on a user instruction. In addition, a rule is typically displayed in the form of "if qualification . . . then command [else command2]" or "if qualification1 then qualification2" form, while a query is typically displayed in the "command [qualification]" form. However, since a structured natural language rule and a structured natural language query typically each includes a command and a qualification, it is thus feasible to use a rule and a query interchangeably. In one embodiment, a user can select a defined query as a rule, or select a defined rule as a query.

Figure 12:
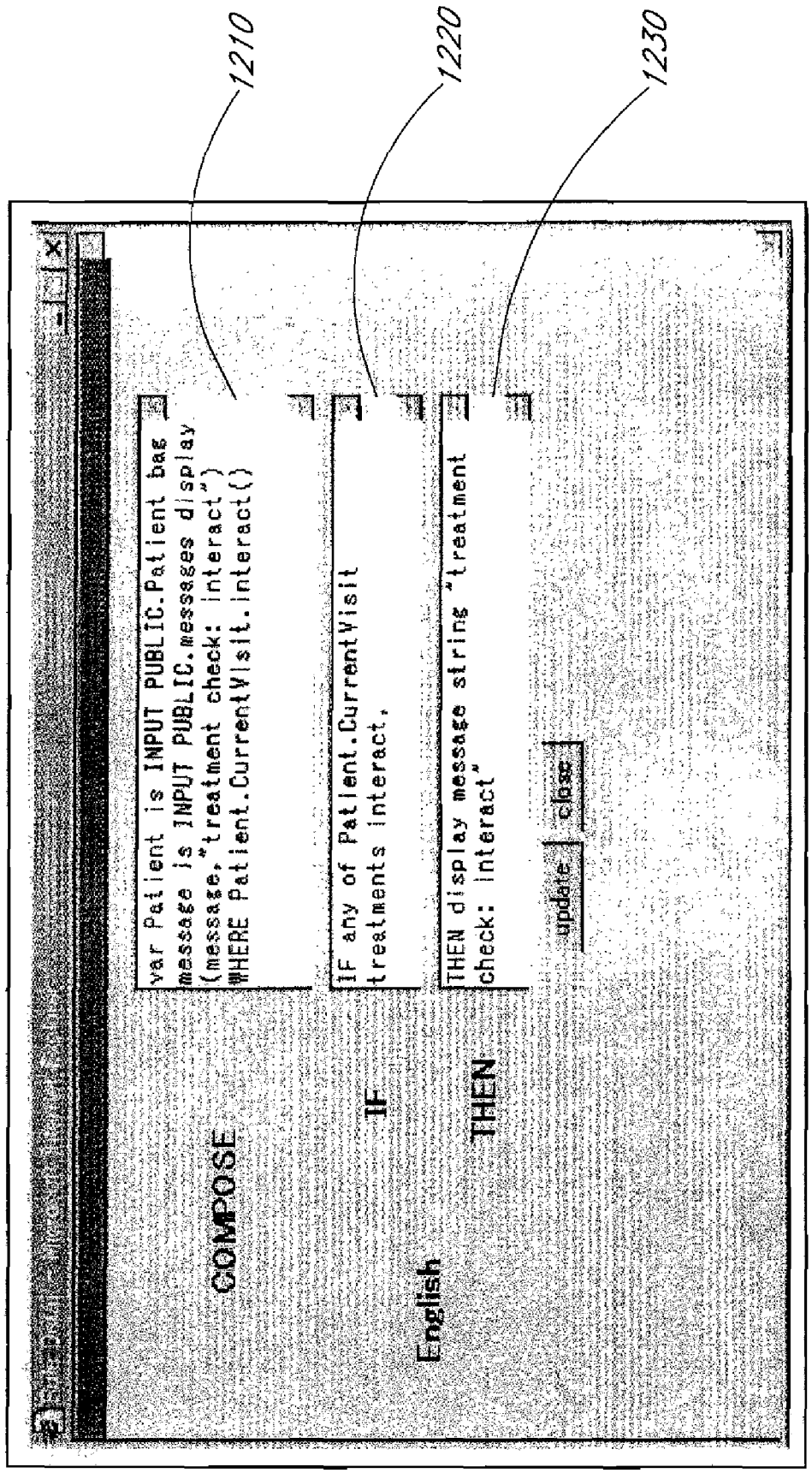
FIG. 12 is an example screen that displays a rule in structured natural language.

FIG. 12 shows an example screen displaying a rule in the form of a structured natural language sentence. A rule includes an optional variable definition phrase, a verb phrase (command) and one or more adjective phrases (qualification). A rule may also include one or more event phrases. A rule can have a second verb phrase corresponding to the action when the qualification is false. In FIG. 12, section 1220 displays the qualification "any of Patient.CurrentVisit treatments interact", and section 1230 displays the command "display message string 'treatment check: interact'". Section 1210 displays the formal query text that corresponds to the rule. The qualification and the command can be specified by a user, for example using the screens of FIGS. 6A-9.

A set of rules can be grouped into a logical unit named a "macro." A user or a programmer can specify the relationship among the rules within the macro, and to use a "goto" statement followed by a label to invoke another rule. The label identifies the other rule to be invoked. For example, a macro for approving or rejecting a loan application can include the following rules:

if house-or-rent="house" then goto(rule-house); else goto (rule-rent); rule-house: if house-value>500,000 and income>40,000 then return(true); else goto(rule-house2);

rule-house2: if house-value>5,000,000 then return(true); else return(false). rule-rent: if income>60,000 then return(true); else return(false).

In the example above, "goto(rule-house)" represents evaluating another rule identified by the label "rule-house". "Return(true)" represents returning a decision to approve the loan application. Instead of returning a "true" or "false" logical value, a rule can also return an object or data source element (DSE) as output.

In real world applications, rules can be far more complex than the example above. The macro and the "goto" statement allow a user or a programmer to specify relationships among the rules. The user or programmer is prompted to assign a macro name to the macro. In addition, a rule or a macro can be used as a condition or command in a query or in another rule.

A plurality of queries, or a combination of one or more rules and one or more queries, can also be grouped into a macro. Queries can be identified by labels, and "goto" statements followed by labels can be used to invoke other queries or rules. A macro can be associated with an object or a class of objects.

Similar to the manner of composing a structured natural language query, a user can compose rules in structured natural language form. Similar to a query sentence, a rule sentence has one or more adjective phrases to specify the qualification of the rule, and a verb phrase to specify the action to be taken when the qualification is true. A rule sentence can have a second verb phrase corresponding to the action to be taken when the qualification is false. A rule sentence can also have one or more optional event phrases, each corresponding to an event.

Referring to FIG. 1, the rule composition module 131 prompts a user to compose a rule by selecting one or more adjective phrases as qualification, one or two verb phrases as commands, and optional adjective phrases as events. The user can also specify a macro of rules and/or queries and specify the relationships among the rules and/or queries within the macro. The rule translation module 141 translates a rule into a formal query text. In one embodiment, the rule translation module 141 can also directly translate a rule into a function, procedure or subroutine in a host programming language of the system 100, such as Java, C, C++, and so forth. The rule processing module 151 evaluates the qualification and subsequently executes the command corresponding to the qualification. In addition, the module 151 monitors the occurrence of the optional events of the rules.

B. Improved Object Relational Query Language

A query or a rule under the improved object relational query language can be expressed in the following form:

Variable specifier

. . .

variable specifier
command
[where qualification]

For each possible value of the variables defined in the variable specifiers, if it satisfies the qualification, then the command is executed. The bracket "[ ]" indicates a qualification is optional. A qualification includes one or more conditions (each condition represented by a method or macro) and the conditions' parameters. A command includes a method or macro and the command's arguments. An argument can be a constant or a variable. A method that returns a Boolean true or false value is a logical method. A macro that returns a Boolean true or false value is a logical macro. Otherwise a method/macro is called a general method or general macro. A method or macro can have one or more input parameters or output parameters. If a general method/macro is used as a condition, the condition is considered true once executed, regardless of the value returned by the method/macro. In the simplest case, a qualification consists of one method or macro with its parameters, and the qualification can be built recursively as follows:

If $\alpha$ and $\beta$ are qualifications then ($\alpha$ and $\beta$) is a qualification.

If $\alpha$ and $\beta$ are qualifications then ($\alpha$ or $\beta$) is a qualification.
If $\alpha$ is a qualification then (not $\alpha$) is a qualification.

A variable specifier can be declared in one of the following forms:

(a) Range of <variable-id> is <data-type>:<DSE>
(b) Temp of <variable-id> is <data-type>
(c) Set of <variable-id> is <data-type>:<DSE>
(d) Bag of <variable-id> is <data-type>:<DSE>
(e) Set Temp of <variable-id> is <data-type>
(f) Bag Temp of <variable-id> is <data-type>

"Data-type" in the forms above represents the format of the data values, such as integer, floating point, logical, text, date, and user-defined data formats. "DSE" in the forms above represents "data source element." A data source element can be a user-defined set of objects, a table, a class, a spreadsheet file that includes a set of data rows, an attribute of an object whose value is a set, a method that returns a set of objects, a set variable as shown in form (c) above, a bag variable as shown in form (d) above, the result of a previous query, an object relational expression as described below in more detail in subsection C, and the like.

In addition, a DSE can be a set of structured data such as a tree, a directed asynchronous graph (DAG) or a semi-structured data set such as an extended markup language (XML) document. A data type can be bound to a DSE in a variety of ways. A subset of a DSE can be formed as another DSE that binds to a data type. For example, assume a tree DSE "T" with two subsets (nodes) called "Person" and "Organization". A binding Person:T may define the collection of Person nodes of "T" as a new DSE. A data type can also be bound to an XML document by the use of tags. For example, binding a class A (a:integer, b:string) to the XML document below results in a DSE with an object A1 of type A whose value is (10, "America). The tags <A1> and </A1> may be ignored because the object A1 can be inferred from the attributes a and b.

```
<ROOT>:
    <A>
        <A1>
            <a> 10 </a>
            <b> America </b>
        </A1>
    </A>
</ROOT>
```

Additionally, a data source element can be dynamically generated to contain the results from one or more previous queries. A variable defined in form (a) above is a range variable. A variable defined in form (b) is a temporary variable. A variable defined in form (c) is a set variable. A variable defined in form (d) is a bag variable. A variable defined in form (e) is a temporary set variable. A variable defined in form (f) above is a temporary bag variable.

A range variable obtains its possible values from its associated DSE. A set of bag variable's value is a set identified by the associated DSE. Unlike a set that contains only distinct values such as {1, 2, 3, 4}, a bag can contain duplicate values such as {1, 2, 3, 4, 1, 3}. Set variables and bag variables can be used to build the domains of range variables or temporary variables. Set and bag variables can also be used to aggregate objects in order to form an argument of a method that requires a set or a bag as an argument. A temporary variable is typically used as an output parameter of a general method. The value of a temporary variable is computed at the time the corresponding method or macro for the query is evaluated. A temporary set or bag variable's value is a set identified by the associated DSE and computed at the time the corresponding method or macro for the query is evaluated.

The above forms illustrate a preferred syntax of the improved object relational query language. Other syntax forms can be used without departing from the sprit and scope of the invention. For example, in another syntax form, variables are declared using the form:

<variable-id> datatype: <data-type>, variabletype: <variable-type>, dse: <DSE> with <variable-type> indicating a variable type of range, temporary, set, bag, temporary set or temporary bag variable.

Some examples are used below to more clearly explain the invention. Returning to the preferred syntax, an example database is defined with two classes, "vertex" and "polygon", with a polygon object defined by a set of vertices and a vertex object defined by two coordinates.

Class vertex (name: string, x: integer, y: integer) key: name
Class polygon (name: string, vertices: set of vertex) key: name Associated with the class polygon, two conditions, "intersect" and "contain," are defined. The "intersect" condition takes two polygons as inputs and returns a true value if the pair of input polygons intersect with each other. The "contain" condition takes two polygons as inputs and returns a true value if the first polygon contains the second.

Some example queries using the improved object relational query language are presented below. The following query finds the names and the vertices of all polygons from the data source element abc:

Range of t is polygon:abc (query B1)
Retrieve (t.name, t.vertices)

The following query finds all pairs of polygons from the data source element abc where one polygon contains the other:

Range of t is polygon:abc (query B2)
Range of s is polygon:abc
Retrieve (t.name, s.name)
Where t.contains(s)

In the query above, "where t.contains(s)" is a qualification. For this qualification, "s" is a parameter of the condition "contains".

The following query shows all polygons from the data source element abc that are contained in polygon C, do not intersect with polygon E, and whose sizes are greater than 5:

Range of t is polygon:abc (query B3)
Range of s is polygon:abc
Range of r is polygon:abc
Var u is float
s.show( )
Where t.name.eq("C") and t.contains(s) and r.name.eq("E") and (not r.intersect(s)) and s.size(u) and u.gt(5)

The following query shows all polygons from the data source element abc that intersect with polygon E, in which the intersection is a square whose size is greater than 5, and whose vertices contain a square whose size is greater than 10:

Range of t is polygon:abc (query B4)
Range of s is polygon:abc
Set u is vertex
Set w is vertex:s.vertices
Var v is float
Var x is float
s.show( )
Where t.name.eq("E") and s.intersection(t, u, v) and is-square(u) and v.gt(5) and is-square(w) and w.size(x) and x.gt(10)

In the query above, "intersection" is a general method associated with a polygon. It takes another polygon as the input and returns the intersection (a set of vertices) and the area of the intersection as the output. The qualification "t.name.eq("E") and s.intersection(t, u, v) and is-square(u) and v.gt(5) and .is-square(w) and w.size(x) and x.gt(10)" includes several conditions joined by the logical connector "and". The condition "is-square" is applied to a set of vertices to determine if the collection of vertices form a square.

The improved object relational language is similar to ANSI SQL-99 in some aspects. For example, query B3 can be rewritten in SQL-99 form:

Select s.show( )
From t abc, s abc, r abc
Where t.name="C" and r.name="E" and tcontains(s) and not
r.intersect(s) and s.size( )>5

However, the improved object relational language has significant advantages over ANSI SQL-99. For example, query B4 cannot be rewritten in SQL-99. Compared to the improved object relational language, ANSI SQL-99 allows only "range" type variables and does not allow set, bag, temporary, temporary set or temporary bag variables. Under SQL-99, the scope of a variable is determined by its "range" type and cannot be an arbitrary data source element. Moreover, a condition under SQL-99 cannot produce any value other than a logical true or false value, so a general method cannot be used as a condition or argument. The improved object relational language removes these limitations.

A rule in the improved object relational query language can be expressed in the form of:
   variable specifier
   . . .
   variable specifier
   [On event] [if qualification then] command [else command2].
   Or
   variable specifier
   . . .
   variable specifier
   [On event] [if qualification] then] qualification2

A rule expressed in the second form "[On event] [if qualification1 then] qualification2" is equivalent to a rule in the first form "[On event] [if qualification then] command [else command2]". However the second form may be more user-friendly in some situations. For example, the following rule in the second form:
   If the patient has prescription x then the patient cannot have prescription y is equivalent to a rule in the first form:
   If the patient has prescription x and the patient has prescription y then report ("constraint violation")

Optionally, a rule can also include a label that identifies the rule, one or more input parameters and one or more output parameters. An input parameter is a parameter whose value is used in the qualification of the rule. An output parameter is a parameter whose value is returned as computed by a command or condition of the rule. A macro in the improved object relational query language can be expressed in the form of:
   [On event:] [Object Type] Macro Macro-Name ([parameter], . . . ,[parameter])
   global Variable specifier
   . . .
   gobal variable specifier
   [label1:] rule/query1;
   . . .
   [label2:] rule/query2;

In the example above, "Object type" refers to the data type of the optional return value. "Parameter" refers to an input or output parameter of the macro. "Label1" represents the label that identifies a rule or a query "rule/query1", "label2" represents the label that identifies a rule or a query "rule/query2". An event may be the addition of a new object, the deletion or modification of an object, or a user-defined event. A rule or a query identified by a label can be invoked by another rule or query with a "goto(label)" statement.

C. Object Relational Algebra

The object relational algebra is preferably characterized as follows:
1. A DSE is an object relational expression ("expression" hereinafter in subsection C).
2. An expression is "type bound" if all elements of the expression have the same non-primitive type. Otherwise it is "type free". A type free expression represents a relation such as a flat file or a set of records whose fields are primitive values such as integers, floating point numbers and text strings.
3. If E is a type bound expression, then $\sigma_P(E)$ is a type-bound expression, where P is a qualification. The operator $\sigma$ (called the "Select" operator) returns as result objects in E that satisfy P. P may include conditions associated with the type of the expression, conditions associated with the attributes of the objects of the expression, or both. If E is a type free expression, then $\sigma_P(E)$ is a type free expression, where P is a qualification. The operator $\sigma$ (called the "Select" operator) returns as result objects in E that satisfy P.
4. If E is an expression, then $\Pi_S(E)$ is a type free expression, where S is a set of attributes. The operator $\Pi$ (called the "Project" operator) and the projection from E) removes those objects of E that satisfy the attributes specified in S from each object of E, and returns as result the other objects of E that do not satisfy the attributes specified in S. In rare occasions, $\Pi_S(E)$ can be a type bound expression.
5. If E and F are expressions then:
   E×F is an expression. The operator (Cartesian Product) computes the set $\{(x,y)|x \in E, y \in F\}$;
   E ∪ F is an expression. The operator (Union) computes the union of the two expressions; and
   E−F is an expression. The operator (Difference) computes the difference between the two expressions.
6. If E is an expression then SGA (E) is a type free expression. The operator G (called the "Aggregate" operator) groups the objects of E according to the set of attributes specified in S (in the form: attribute, attribute, . . . ), and for each group computes the set of aggregate functions in the form of aggregate-function(attribute) or aggregate-function(object). The aggregate functions can include primitive functions such as min, max, mean, variance, avg, sum, count that can be applied to a group of primitive values. The aggregate functions can also include general functions defined by users or programmers that can be applied to a group of non-primitive objects. A general function is a user or programmer defined non-primitive function operated on a set of non-primitive objects. For example, a user or programmer can define a "best image" general function to process a collection of visual image files and return as output the visual image file with the best signal-to-noise ratio. When the general function is called to operate, the general function typically calls a program, a procedure, a query, a collection of primitive functions, a collection of primitive and general functions, or a collection of other general functions. In rare occasions, SGA (E) can be a type bound expression.
7. If f is a method or macro that returns a DSE as its result, then f(arguments) is an expression. Whether f(arguments) is type free or type bound is determined by the type of the elements in the DSE. If all elements of the DSE belong to the same type and the type is not primitive, the expression is type-bound; otherwise it is type-free.

Some example object relational expressions are shown below with an object class "patient" and a data source element "hospital" defined.

To retrieve those patients of hospital who are diagnosed to have mild AD and who respond to the medication "Aericept", call the set S1:
   $S1 \leftarrow \sigma P1$(hospital), where $P1$=diagnosed("mild $AD$") and respond_to("Aericept") (query C1)

To retrieve those patients of hospital who are diagnosed to have moderate AD and who respond to the medication "Aericept", call the set S2:
   $S2 \leftarrow \sigma P2$(hospital), where $P2$=diagnosed("moderate $AD$") and respond_to("Aericept") (query C2)

To compute the union of S1 and S2 and call the result S:
   S←S1∪S2 (query C3)

To find the average age of the male and female patients in S:
   $_{gender}G_{avg(age)}(S)$ (query C4)

To extract the gene profiles of the patients in S1, call it G1:
   $G1 \leftarrow \Pi_{gene\text{-}profile}(S1)$ (query C5)

To extract the gene profiles of the patients in S2, call it G2:
   $G2 \leftarrow \Pi_{gene\text{-}profile}(S^2)$ (query C6)

To compare G1 and G2, and plot the results:
   Compare_profile_and plot(G1,G2) (query C7)

The queries can be combined in a number of ways. For example, queries C1 to C4 can be combined into one query as:

$_{gender}G_{avg(age)}(\sigma_{P1}(\text{hospital}) \cup \sigma_{P2}(\text{hospital}))$ (query C8)

Compared to conventional relational algebra, the object relational algebra enables the manipulation of complex objects. Under relational algebra, a data source element is simply a relation such as a flat file or a set of records whose fields are primitive values. Moreover, as described above in the Background section, a condition of the "select" operator is restricted to simple comparisons of primitive values. In addition, a method is not allowed to be an expression under relational algebra. Finally, aggregation functions under conventional relational algebra are restricted to functions such as minimum, maximum, mean, variance, average, sum and count, which can be applied only to primitive values. The object relational algebra removes these limitations and provides significant advantages over conventional relational algebra.

Although the present invention has been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. For example, the modules of the structured natural language system 100 can be combined or separated into more or fewer modules. Some of the actions illustrated in the flowcharts can be executed in parallel, in sequence or in different orders. Accordingly, the present invention is not to be limited by the description of the preferred embodiments, but is to be defined by reference to the appended claims.

The following tables list some sample methods included in one embodiment of the system. It should be understood that not all of the methods listed below need to be included in a system of the invention, and that additional methods can be defined.

System Provided Methods

Sample Logical Methods

| Method Name | Argument | Return Value | Comment |
| --- | --- | --- | --- |
| Gt | (First Argument: single, Second Argument: single) | Boolean | Returns TRUE if single type and First Argument > Second Argument. |
| Ge | (First Argument: single, Second Argument: single) | Boolean | Returns TRUE if single type and First Argument >= Second Argument. |
| Lt | (First Argument: single, Second Argument: single) | Boolean | Returns TRUE if single type and First Argument < Second Argument. |
| Le | (First Argument: single, Second Argument: single) | Boolean | Returns TRUE if single type and First Argument <= Second Argument. |
| Eq | (First Argument: single, Second Argument: single) | Boolean | Returns TRUE if single type and First Argument == Second Argument. |
| Ne | (First Argument: single, Second Argument: single) | Boolean | Returns TRUE if single type and First Argument != Second Argument. |
| Gt | (First Argument: integer, Second Argument: integer) | Boolean | Returns TRUE if integer type and First Argument > Second Argument. |
| Ge | (First Argument: integer, Second Argument: integer) | Boolean | Returns TRUE if integer type and First Argument >= Second Argument. |
| Lt | (First Argument: integer, Second Argument: integer) | Boolean | Returns TRUE if integer type and First Argument < Second Argument. |
| Le | (First Argument: integer, Second Argument: integer) | Boolean | Returns TRUE if integer type and First Argument <= Second Argument. |
| Eq | (First Argument: integer, Second Argument: integer) | Boolean | Returns TRUE if integer type and First Argument == Second Argument. |
| Ne | (First Argument: integer, Second Argument: integer) | Boolean | Returns TRUE if integer type and First Argument != Second Argument. |
| Gt | (First Argument: string, Second Argument: string) | Boolean | Returns TRUE if the result of First Argument. Compare To (Second Argument) is greater than 0. Compare To is a method of the String class of Java. |
| Ge | (First Argument: string, Second Argument: string) | Boolean | Returns TRUE if the result of First Argument. Compare To (Second Argument) is greater than 0. Compare To is a method of the String class of Java. |

-continued

| Method Name | Argument | Return Value | Comment |
|---|---|---|---|
| Lt | (First Argument: string, Second Argument: string) | Boolean | Returns TRUE if the result of First Argument. Compare To (Second Argument) is greater than 0. Compare To is a method of the String class of Java. |
| Le | (First Argument: string, Second Argument: string) | Boolean | Returns TRUE if the result of First Argument. Compare To (Second Argument) is greater than 0. Compare To is a method of the String class of Java. |
| Eq | (First Argument: string, Second Argument: string) | Boolean | Returns TRUE if string type and First Argument and Second Argument are the same. |
| Ne | (First Argument: string, Second Argument: string) | Boolean | Returns TRUE if string type and First Argument and Second Argument are not the same. |

Sample General Methods

| Method Name | Parameter | Return Value | Comment |
|---|---|---|---|
| as | (First Argument: single s, Second Argument: single s) | Boolean | Returns TRUE if single type and First Argument is assigned to Second Argument. |
| add | (First Argument: single s, Second Argument: single s, Third Argument: single s) | Boolean | For single type, adds First Argument and Second Argument, substitutes the value into Third Argument, and returns TRUE. |
| sub | (First Argument: single s, Second Argument: single s, Third Argument: single s) | Boolean | For single type, subtracts Second Argument from First Argument, substitutes the value into Third Argument, and returns TRUE. |
| mult | (First Argument: single s, Second Argument: single s, Third Argument: single s) | Boolean | For single type, multiplies First Argument from Second Argument, substitutes the value into Third Argument, and returns TRUE. |
| div | (First Argument: single s, Second Argument: single s, Third Argument: single s) | Boolean | For single type, divides First Argument by Second Argument, substitutes the value into Third Argument, and returns TRUE. |
| as | (First Argument: integer i, Second Argument: integer I) | Boolean | Returns TRUE if integer type and First Argument is assigned to Second Argument. |
| add | (First Argument: Integer i, Second Argument: integer i, Third Argument: integer I) | Boolean | For integer type, adds First Argument and Second Argument, substitutes the value into Third Argument, and returns TRUE. |
| sub | (First Argument: integer I, Second Argument: integer i, Third Argument: integer I) | Boolean | For integertype, subtracts Second Argument from First Argument, substitutes the value into Third Argument, and returns TRUE. |
| mult | (First Argument: integer I, Second Argument: integer i, Third Argument: integer I) | Boolean | For integertype, multiplies First Argument by Second Argument, substitutes the value into Third Argument, and returns TRUE. |
| div | (First Argument: integer i, Second Argument: integer i, Third Argument: integer i) | Boolean | For integer type, divides First Argument by Second Argument, substitutes the value into Third Argument, and returns TRUE. |
| as | (First Argument: string s, Second Argument: string s) | Boolean | Returns TRUE if string type and First Argument is assigned to Second Argument. |
| max | (First Argument: DatasourceElement dse, Second Argument: string fieldName, Third Argument: single result) | Boolean | For single type, First Argument DatasourceElement, and Second Argument string (fieldname specified), sets the maximum value to result and returns TRUE. |

-continued

| Method Name | Parameter | Return Value | Comment |
|---|---|---|---|
| max | (First Argument: DatasourceElement dse, Second Argument: string fieldName, Third Argument: integer result) | Boolean | For integer type, First Argument DatasourceElement, and Second Argument string (fieldname specified), sets the maximum value to result and returns TRUE. |
| min | (First Argument: DatasourceElement dse, Second Argument: string fieldName, Third Argument: single result) | Boolean | For single type, First Argument DatasourceElement, and Second Argument string (fieldname specified), sets the minimum value to result and returns TRUE. |
| min | (First Argument: DatasourceElement dse, Second Argument: string fieldName, Third Argument: integer result) | Boolean | For integer type, First Argument DatasourceElement, and Second Argument string (fieldname specified), sets the minimum value to result and returns TRUE. |
| avg | (First Argument: DatasourceElement dse, Second Argument: string fieldName, Third Argument: single result) | Boolean | For single type, First Argument DatasourceElement, and Second Argument string (fieldname specified), sets the average value to result and returns TRUE. |
| count | (First Argument: DatasourceElement dse, Second Argument: integer result) | Boolean | For integer type, First Argument DatasourceElement, and sets the count value to result and returns TRUE. |
| union | (First Argument: DatasourceElement dse, Second Argument: DatasourceElement dse) | Datasource Element | Uses First Argument DatasourceElement and Second Argument DatasourceElement to set the values and returns DatasourceElement. |
| unionall | (First Argument: DatasourceElement dse, Second Argument: DatasourceElement dse) | Datasource Element | Uses First Argument DatasourceElement and Second Argument DatasourceElement to set the values and returns DatasourceElement. |
| dereference | (First Argument: DatasourceElement dse, Second Argument: DatasourceElement dse) | Datasource Element | Uses First Argument DatasourceElement and Second Argument DatasourceElement to set the values and returns DatasourceElement. |

Sample Logical Methods Related to Dates

| Method Name | Parameter | Return Value | Comment |
|---|---|---|---|
| before | (First Argument: date when) | Boolean | Returns TRUE only if the time point is before the time point of the when object. |
| after | (First Argument: date when) | Boolean | Returns TRUE only if the time point is after the time point of the when object. |

Additional Sample Methods

| Method Name | Parameter | Return Value | Comment |
|---|---|---|---|
| isNull | None | Boolean | Returns TRUE if NULL. |
| cast | (First Argument: (PrimitiveDataType dt) | Boolean | Returns the value as the PrimitiveDataType value. |
| gt | (First Argument: integer or [string, integer, shortint, longint, single, real]) | Boolean | Returns TRUE if the value > First Argument. |
| ge | (First Argument: integer or [string, integer, shortint, longint, single, real]) | Boolean | Returns TRUE if the value >= First Argument. |
| lt | (First Argument: integer or [string, integer, shortint, longint, single, real]) | Boolean | Returns TRUE if the value < First Argument. |

-continued

| Method Name | Parameter | Return Value | Comment |
| --- | --- | --- | --- |
| le | (First Argument: integer or [string, integer, shortint, longint, single, real]) | Boolean | Returns TRUE if the value <= First Argument. |
| eq | (First Argument: integer or [string, integer, shortint, longint, single, real]) | Boolean | Returns TRUE if the value == First Argument. |
| ne | (First Argument: integer or [string, integer, shortint, longint, single, real]) | Boolean | Returns TRUE if the value != First Argument. |
| as | (First Argument: integer or [string, integer, shortint, longint, single, real]) | Boolean | Assings the value of the argument and returns TURE. |
| add | (First Argument: integer or [string, integer, shortint, longint, single, real], Second Argument: integer or [string, integer, shortint, longint, single, real]) | Boolean | Adds First Argument and Second Argument, substitutes the value into Second Argument, and returns TRUE. |
| sub | (First Argument: integer or [shortint, longint, single, real], Second Argument: integer or [shortint, longint, single, real]) | Boolean | Subtracts the value from First Argument, substitutes the value into Second Argument, and returns TRUE. |
| mult | (First Argument: integer or [shortint, longint, single, real], Second Argument: integer or [shortint, longint, single, real]) | Boolean | Multiplies the value by First Argument, substitutes the value into Second Argument, and returns TRUE. |
| div | (First Argument: integer or [shortint, longint, single, real], Second Argument: integer or [shortint, longint, single, real]) | Boolean | Divides the value by First Argument, substitutes the value into Second Argument, and returns TRUE. |
| getAllMatches | (First Argument: string pattern) | Boolean | Searches for the argument pattern as match pattern, and returns the results in an array of the REMatch type. |
| getMatch | (First Argument: string pattern) | Boolean | Searches for the argument pattern as pattern, and returns the first match. |
| isMatch | (First Argument: string pattern) | Boolean | Searches for the argument pattern as match pattern, and returns TRUE if matched. |
| hasMoreElements | (First Argument: string pattern) | Boolean | Regular expression pattern |
| hasMoreMatches | (First Argument: string pattern) | Boolean | Regular expression pattern |
| endsWith | (First Argument: String suffix) | Boolean | Determines if the string ends with the specified suffix. |
| EqualsIgnoreCase | (First Argument: String anotherString) | Boolean | Compares the string with another string. |
| startsWith | (First Argument: String prefix) | Boolean | Determines if the string starts with the specified prefix. |

What is claimed is:

1. A computer-implemented method of translating an imperative natural language sentence into formal query text for an object-relational database, the method comprising:
   receiving, in a computer system, a natural language imperative sentence, wherein the imperative sentence is a sentence that expresses a request for information;
   parsing, in the computer system, the imperative natural language sentence to identify one or more verb phrases of the sentence;
   parsing, in the computer system, the imperative natural language sentence to identify one or more noun phrases of the sentence;
   determining, in the computer system, from each parsed natural language verb phrase one or more defined object-relational methods;
   determining, in the computer system, from each parsed natural language noun phrase one or more object-relational data source elements; and
   using the one or more determined object-relational methods and the one or more determined data source elements to create a formal query text in an object-relational algebra compatible for use in the object-relational database.

2. The method of claim 1, further comprising searching, in the computer system, the object-relational database for data entries stored within the database that satisfies the formal query text.

3. The method of claim 2, further comprising providing through a user interface, provided by the computer system, one or more data entries stored within the object-relational database that satisfy the formal query text.

4. The method of claim 1, further comprising:
parsing, in the computer system, the natural language sentence to identify one or more adjective phrases of the sentence;
determining, in the computer system, from each parsed natural language adjective phrase one or more defined conditions; and
wherein the one or more defined conditions are used with the one or more determined object-relational methods and the one or more determined data source elements to create the formal query text for use in the object-relational database.

5. The method of claim 1, wherein at least one of the object-relational defined data source elements comprises a set of objects, a table, or a class.

6. The method of claim 1, wherein at least one defined object-relational methods is capable of returning a value other than a Boolean true or false value.

7. A computer system for translating an imperative natural language sentence into formal query text compatible for use in an object-relational database, the system comprising:
an object-relational database comprising a plurality of data objects, the database further comprising a plurality of user-defined object-relational methods, a plurality of object-relational data source elements, and a plurality of user-defined conditions;
a parsing module of executable program code running on the computer system, the parsing module configured to parse a natural language imperative sentence that expresses a request for information to identify one or more verb phrases of the sentence, one or more noun phrases and an optional one or more adjective phases; and
a translation module of executable program code running on the computer system in communication with the database, the translation module configured to (a) determine from a natural language verb phrase one or more defined object-relational methods, (b) determine from each noun phrase one or more object-relational data source elements, and (c) determine from each optional adjective phase one or more defined conditions, the translation module further configured to create formal query text in an object-relational algebra that is compatible for use in the object-relational database, wherein the formal query text is determined from the one or more determined object-relational methods, the one or more determined object-relational data source elements, and the optional one or more determined conditions.

8. The system of claim 7, further comprising a formal query processing module of executable program code running on the computer system in communication with the database, the formal query process module configured to search the database for data objects from the object-relational database that satisfy the formal query text.

9. The system of claim 8, further comprising a user interface provided by the computer system in communication with the formal query processing module, the user interface adapted to receive from a user a natural language imperative sentence.

10. The system of claim 7, wherein the user interface provided by the computer system is further adapted to convey to a user data entries from the object-relational database found by the formal query processing module to satisfy a formal query text.

11. The system of claim 7, wherein at least one of the defined object-relational data source elements comprises a set of objects, a table, or a class.

12. The system of claim 7, wherein at least one of the defined object-relational methods is capable of returning a value other than a Boolean true or false value.

13. A computer-implemented method of creating a query in an object-relational algebra, the method comprising:
prompting, via a user interface provided by a computer system, a user to choose one or more previously defined object-relational methods and/or one or more object-relational algebra operators;
prompting, via the user interface, the user to choose from a list of defined objected relational data source elements as one or more arguments to the one or more methods selected or the one or more operators selected;
prompting, via the user interface, the user to choose an optional one or more conditions from at least a set of defined conditions, and prompting the user to specify one or more parameters for each selected condition; and
using object-relational algebra to create an object-relational compatible query with the responses received from the user.

14. The method of claim 13, further comprising receiving from a user, via the user interface provided by the computer system, in response to a prompt for an argument of the object-relational method or a parameter of a condition, a constant or a variable that is declared to be a range variable, a bag variable, a set variable, a temporary variable, a temporary bag variable, or a temporary set variable whose domain is chosen from a list of defined object relational data source elements.

15. The method of claim 13, further comprising receiving from a user, via the user interface provided by the computer system, in response to a prompt for an argument of the object-relational method or a parameter of a condition, a previously created constant or variable.

16. The method of claim 13, further comprising receiving from a user, via the user interface provided by the computer system, in response to a prompt for an object-relational data source element, an object-relational query created recursively.

17. A computer system for creating a query in an object-relational algebra, the system comprising:
a database comprising previously defined object-relational methods, object-relational algebra operators, defined object-relational data source elements, and defined conditions;
a user interface, provided by the computer system, adapted to prompt a user to choose one or more previously defined object-relational algebra methods or one or more object-relational algebra operators;
the user interface further adapted to prompt the user to choose from a list of defined data source elements as one or more arguments to the one or more object-relational methods selected or the one or more operators selected;
the user interface further adapted to prompt the user to choose an optional one or more conditions from at least a set of defined conditions, and prompting the user to specify one or more parameters for each selected condition; and
a query translation module of executable program code running on the computer system configured to use object-relational algebra to create an object-relational query with the responses received from the user.

18. The system of claim 17, further comprising a formal query processing module in communication with the database, the formal query process module configured to search the object-relational database for data entries that satisfy a formal query text.

19. The system of claim 17, wherein the user interface is further adapted to convey to a user data entries from the object-relational database found by the formal query processing module to satisfy a formal query text.

20. The system of claim 17, wherein an object-relational data source elements comprises a constant or a variable that is declared to be a range variable, a bag variable, a set variable, a temporary variable, a temporary bag variable, or a temporary set variable whose domain is chosen from a list of defined object relational data source elements.

21. The system of claim 17, wherein the parameters of an object-relational condition comprise a constant or a variable that is declared to be a range variable, a bag variable, a set variable, a temporary variable, a temporary bag variable, or a temporary set variable whose domain is chosen from a list of defined object relational data source elements.

22. The system of claim 17, wherein the object-relational data source elements comprise a previously created constant or variable.

23. The system of claim 17, wherein the parameters of an object-relational condition comprise a previously created constant or variable.

24. The system of claim 17, wherein the object-relational data source elements comprise an object-relational query created recursively.

* * * * *

UNITED STATES PATENT AND TRADEMARK OFFICE
CERTIFICATE OF CORRECTION

PATENT NO.         : 7,620,542 B2                                           Page 1 of 1
APPLICATION NO. : 11/846428
DATED              : November 17, 2009
INVENTOR(S)        : Sheu et al.

It is certified that error appears in the above-identified patent and that said Letters Patent is hereby corrected as shown below:

Column 13, Lines 30-31, "else goto (rule-rent);" should be changed to --else goto(rule-rent);--

Column 16, Line 12, "Retrieve (tname, s.name)" should be changed to --Retrieve (t.name, s.name)--

Column 16, Line 39, "and is-square(w) and" should be changed to --and .is-square(w) and--

Column 16, Line 55, "and tcontains(s) and" should be changed to --and t.contains(s) and--

Column 18, Line 65, "($S^2$) (query C6)" should be changed to --(S2) (query C6)--

Column 18, Line 67, "Compare_profile_and plot" should be changed to --Compare_profile_and_plot--

Columns 23-24, Line 15, "Argument string (fleidname" should be changed to

--Argument string (fieldname--

Column 27, Line 35, "phases and an optional one or more adjective phases; and"

should be changed to --phrases and an optional one or more adjective phrases; and--

Colum, 27, Line 44, "phase one or more" should be changed to --phrase one or more--

Column 29, Line 9, "data source elements" should be changed to --data source element--

Signed and Sealed this

First Day of June, 2010

David J. Kappos
*Director of the United States Patent and Trademark Office*